(12) United States Patent
Fang

(10) Patent No.: US 10,014,715 B2
(45) Date of Patent: *Jul. 3, 2018

(54) POWER SOURCE CONVERSION MODULE, POWER SUPPLY APPARATUS AND POWER SUPPLY METHOD

(71) Applicant: Huawei Technologies Co., Ltd., Shenzhen (CN)

(72) Inventor: Qingyin Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

This patent is subject to a terminal disclaimer.

(21) Appl. No.: 14/738,164

(22) Filed: Jun. 12, 2015

(65) Prior Publication Data

US 2015/0280494 A1 Oct. 1, 2015

Related U.S. Application Data

(63) Continuation of application No. 14/481,216, filed on Sep. 9, 2014, now Pat. No. 9,088,175, which is a (Continued)

(30) Foreign Application Priority Data

Aug. 1, 2013 (CN) .......................... 2013 1 0331761

(51) Int. Cl.
*H02J 9/06* (2006.01)

(52) U.S. Cl.
CPC ........... *H02J 9/061* (2013.01); *Y10T 307/615* (2015.04)

(58) Field of Classification Search
CPC ......... H02J 9/00; H02J 9/061; Y10T 307/615; Y10T 307/62
(Continued)

(56) References Cited

U.S. PATENT DOCUMENTS

| 5,939,799 A | 8/1999 | Weinstein |
| 6,330,176 B1 | 12/2001 | Thrap et al. |

(Continued)

FOREIGN PATENT DOCUMENTS

| CN | 101228681 A | 7/2008 |
| CN | 201838298 U | 5/2011 |

(Continued)

OTHER PUBLICATIONS

Foreign Communication From a Counterpart Application, Chinese Application No. 201310331761.0, Chinese Office Action dated May 3, 2016, 6 pages.

(Continued)

*Primary Examiner* — Hal Kaplan
(74) *Attorney, Agent, or Firm* — Conley Rose, P.C.

(57) ABSTRACT

A power supply apparatus including: N+m power source conversion modules, where N power source conversion modules are main power source conversion modules; a power source conversion module includes a detection and switching unit and a conversion unit, where the detection and switching unit is separately connected to an output end of a first alternating current power source and an output end of a second alternating current power source, and the detection and switching unit is configured to monitor in real time a working state of the first alternating current power source and a working state of the second alternating current power source, close a channel between the conversion unit and one power source, which is in a normal working state, of the first alternating current power source and the second alternating current power source.

29 Claims, 12 Drawing Sheets

Related U.S. Application Data continuation of application No. PCT/CN2014/070869, filed on Jan. 20, 2014.

(58) Field of Classification Search
    USPC .................................................... 307/64, 65
    See application file for complete search history.

(56) References Cited

U.S. PATENT DOCUMENTS

| | | |
|---|---|---|
| 6,630,753 B2 | 10/2003 | Malik et al. |
| 7,459,804 B2 | 12/2008 | Marwali et al. |
| 8,674,555 B2 | 3/2014 | Galm et al. |
| 2002/0145339 A1 | 10/2002 | Liu et al. |
| 2004/0036359 A1 | 2/2004 | Griffith et al. |
| 2007/0018502 A1 | 1/2007 | Bazinet |
| 2011/0148204 A1 | 6/2011 | DiMarco et al. |

FOREIGN PATENT DOCUMENTS

| | | |
|---|---|---|
| CN | 101621214 B | 9/2012 |
| CN | 102710010 A | 10/2012 |

OTHER PUBLICATIONS

Foreign Communication From a Counterpart Application, European Application No. 14755766.4, Extended European Search Report dated Sep. 9, 2015, 7 pages.
Partial English Translation and Abstract of Chinese Patent Application No. CN102710010A, Jun. 10, 2015, 5 pages.
Office Action dated Nov. 14, 2014, U.S. Appl. No. 14/481,216, filed Sep. 9, 2014, 14 pages.
Foreign Communication From a Counterpart Application, PCT Application No. PCT/CN2014/070869, English Translation of International Search Report dated Apr. 30, 2014, 2 pages.
Foreign Communication From a Counterpart Application, PCT Application No. PCT/CN2014/070869, Written Opinion dated Apr. 30, 2014, 7 pages.

POWER SOURCE CONVERSION MODULE, POWER SUPPLY APPARATUS AND POWER SUPPLY METHOD

CROSS-REFERENCE TO RELATED APPLICATIONS

This application is a continuation of U.S. patent application Ser. No. 14/481,216, filed on Sep. 9, 2014, which is a continuation of International Application No. PCT/CN2014/070869, filed on Jan. 20, 2014, which claims priority to Chinese Patent Application No. 201310331761.0, filed on Aug. 1, 2013, all of which are hereby incorporated by reference in their entireties.

TECHNICAL FIELD

Embodiments of the present invention relate to electronic technologies, and in particular, to a power source conversion module, a power supply apparatus and a power supply method.

BACKGROUND

A typical communications device and a typical information communications technology (ICT) device include a power supply apparatus, a service board, a cooling fan, and the like. The power supply apparatus is responsible for receiving one or more power source inputs outside a device, and converting the power source, which is input from outside the device, into a power source available to a load (including the service board, the cooling fan, and the like) in the device.

As shown in FIG. 1, when N (number of) power sources are input to the power supply apparatus, N power source conversion modules need to be disposed in the power supply apparatus. Each power source conversion module is connected to one power source, that is, the N power sources need N power source conversion modules, and the power source conversion module converts an output voltage of the power source into a direct current voltage required by a load in a device, which generally is −48 volts (V) or 12 V. To meet high reliability, N+N standby is generally performed on power sources, that is, each power source has a standby power source. Each power source conversion module receives power from one power source. Correspondingly, N+N standby is also performed on the power source conversion modules, where N power source conversion modules receive power from N line-A power sources, and other N power source conversion modules receive power from N line-B power sources.

Therefore, when N+N standby is performed on N power sources, N+N standby also needs to be performed on the power source conversion modules. The power supply apparatus needs a large number of power source conversion modules; especially, for a high-power device, the power supply apparatus needs more power source conversion modules. For example, for a device with power consumption over 20 kilowatts (kW), the number of power source conversion modules may exceed 16. Therefore, the power supply apparatus needs a large number of power source conversion modules, which increases power supply costs of a system, and also increases space occupied by the power source conversion modules.

SUMMARY

Embodiments of the present invention provide a power source conversion module, a power supply apparatus and a power supply method, which are used to solve the defect of the large number of power source conversion modules in a power supply apparatus, thereby decreasing the number of power source conversion modules in the power supply apparatus while meeting high reliability of the power supply.

According to a first aspect, an embodiment of the present invention provides a power source conversion module, including a detection and switching unit and a conversion unit, where the detection and switching unit is separately connected to an output end of a first alternating current power source and an output end of a second alternating current power source, the detection and switching unit is further connected to the conversion unit, and the conversion unit is connected to a load, where the detection and switching unit is configured to monitor in real time a working state of the first alternating current power source and a working state of the second alternating current power source, close a channel between the conversion unit and one power source, which is in a normal working state, of the first alternating current power source and the second alternating current power source, and shut off a channel between the conversion unit and the other power source of the first alternating current power source and the second alternating current power source; and the conversion unit is configured to rectify an alternating current voltage output by the one alternating current power source, which is in the normal working state, in the channel closed by the detection and switching unit, and convert the alternating current voltage into a direct current voltage required by the load.

With reference to the first aspect, in a first possible implementation manner, the detection and switching unit includes a detection subunit, a control subunit, a first switching subunit and a second switching subunit, where the detection subunit is separately connected to the output end of the first alternating current power source and the output end of the second alternating current power source; the detection subunit is further connected to the control subunit; and the detection subunit is configured to detect in real time a voltage value of the first alternating current power source and a voltage value of the second alternating current power source, and send the detected voltage value of the first alternating current power source and the detected voltage value of the second alternating current power source to the control subunit; the control subunit is separately connected to the detection subunit, the first switching subunit and the second switching subunit; and the control subunit is configured to monitor in real time, according to the voltage value of the first alternating current power source, whether the first alternating current power source is in a normal working state, and monitor in real time, according to the voltage value of the second alternating current power source, whether the second alternating current power source is in a normal working state; the first switching subunit is separately connected to the first alternating current power source, the conversion unit and the control subunit; and the second switching subunit is separately connected to the second alternating current power source, the conversion unit and the control subunit; the control subunit is further configured to, according to a working state of the first alternating current power source and a working state of the second alternating current power source, send a closing signal to the first switching subunit or the second switching subunit connected to one alternating current power source, which is in a normal working state, of the first alternating current power source and the second alternating current power source, and send a shutoff signal to the first switching subunit or the second switching subunit connected to the other power source, so as to close the channel between the conversion unit and the one alternating current power source, which is in the normal working state, of the first alternating current power source and the second alternating current power source, and shut off the channel between the conversion unit and the other alternating current power source of the first alternating current power source and the second alternating current power source; the first switching subunit is configured to shut off or close the channel between the first alternating current power source and the conversion unit according to a control signal sent by the control subunit; and the second switching subunit is configured to shut off or close the channel between the second alternating current power source and the conversion unit according to the control signal sent by the control subunit.

With reference to the first aspect or the first possible implementation manner of the first aspect, in a second possible implementation manner, the detection and switching unit further includes a shutoff confirming subunit, where the shutoff confirming subunit is separately connected to the control subunit, the first switching subunit, the second switching subunit and the conversion unit; the control subunit is further configured to first send the shutoff signal to the first switching subunit or the second switching subunit connected to one alternating current power source, which is in an abnormal working state, of the first alternating current power source and the second alternating current power source, then send a shutoff confirming indication signal that includes a channel identifier to the shutoff confirming subunit, and after receiving a shutoff confirming signal sent by the shutoff confirming subunit, send the closing signal to the first switching subunit or the second switching subunit connected to the other alternating current power source of the first alternating current power source and the second alternating current power source, where the channel identifier is used to identify a channel between the first alternating current power source and a connection unit, or the channel between the second alternating current power source and the conversion unit; and the shutoff confirming subunit is configured to, after receiving the shutoff confirming indication signal sent by the control subunit, determine whether a channel corresponding to the channel identifier is shut off, and after it is determined that the channel corresponding to the channel identifier is shut off, send a shutoff confirming response signal to the control subunit.

According to a second aspect, an embodiment of the present invention provides a power supply control method, where each power source conversion module in a power supply apparatus is separately connected to a first alternating current power source and a second alternating current power source, and the method includes monitoring in real time a working state of the first alternating current power source and a working state of the second alternating current power source according to a working state of the first alternating current power source and a working state of the second alternating current power source, closing a channel between a conversion unit in the power source conversion module and one power source, which is in a normal working state, of the first alternating current power source and the second alternating current power source, and shutting off a channel between the conversion unit and the other power source of the first alternating current power source and the second alternating current power source; and rectifying an alternating current voltage output by the one alternating current power source, which is in the normal working state, in the channel closed by a detection and switching unit, and converting the alternating current voltage into a direct current voltage required by a load.

With reference to the second aspect, in a first possible implementation manner, the method further includes, if the first alternating current power source is in an abnormal working state and the second alternating current power source is in an abnormal working state, sending an alarm message to a host that manages the power supply apparatus.

With reference to the second aspect or the first possible implementation manner of the second aspect, in a second possible implement manner, the monitoring in real time a working state of the first alternating current power source and a working state of the second alternating current power source includes monitoring in real time a voltage value of the first alternating current power source and a voltage value of the second alternating current power source, determining, according to the voltage value of the first alternating current power source, whether the first alternating current power source is in a normal working state, and determining, according to the voltage value of the second alternating current power source, whether the second alternating current power source is in a normal working state.

According to a third aspect, an embodiment of the present invention further provides a power supply apparatus, including N+m power source conversion modules described in the foregoing, where output ends of the N+m power source conversion modules are connected in parallel, so as to implement load balancing, where N of the power source conversion modules are main power source conversion modules, and m of the power source conversion modules are standby power source conversion modules, N is a natural number, and m is an integer greater than or equal to 0 and less than or equal to N.

In the foregoing technical solutions, a power source conversion module uses one alternating current power source, which is in a normal working state, of two alternating current power sources connected to the power source conversion module as a power supply, and converts an alternating current voltage output by the power supply and outputs the converted alternating current voltage to a load. Therefore, dual standby is implemented on the alternating current power sources connected to the power source conversion module. Because the dual standby is implemented for alternating current power sources connected to each power source conversion module, for a power supply apparatus including N power source conversion modules, N+N standby is implemented on the power source input by the power supply apparatus, thereby meeting a requirement of providing a highly reliable power supply for the load. In the prior art, to implement N+N standby of the power source, a power supply apparatus requires N+N power source conversion modules, but the power supply apparatus provided in this embodiment only requires N power source conversion modules. Therefore, under the circumstance where high reliability of the power supply is met, the number of power source conversion modules included in the power supply apparatus provided in this embodiment is far less than the number of power source conversion modules included in the power supply apparatus provided in the prior art, thereby reducing production costs of the power supply apparatus. Further, to implement standby of the power source conversion module, at least one power source conversion module may be added in the power supply apparatus, and therefore, the power supply apparatus that includes N+m power source conversion modules implements not only N+N standby of the power supply but also N+m standby of the power source conversion module.

BRIEF DESCRIPTION OF DRAWINGS

To make the technical solutions in the embodiments of the present invention clearer, accompanying drawings required for illustrating the embodiments are briefly introduced below. The accompanying drawings in the following description are some embodiments of the present invention.

DESCRIPTION OF EMBODIMENTS

Figure 1:
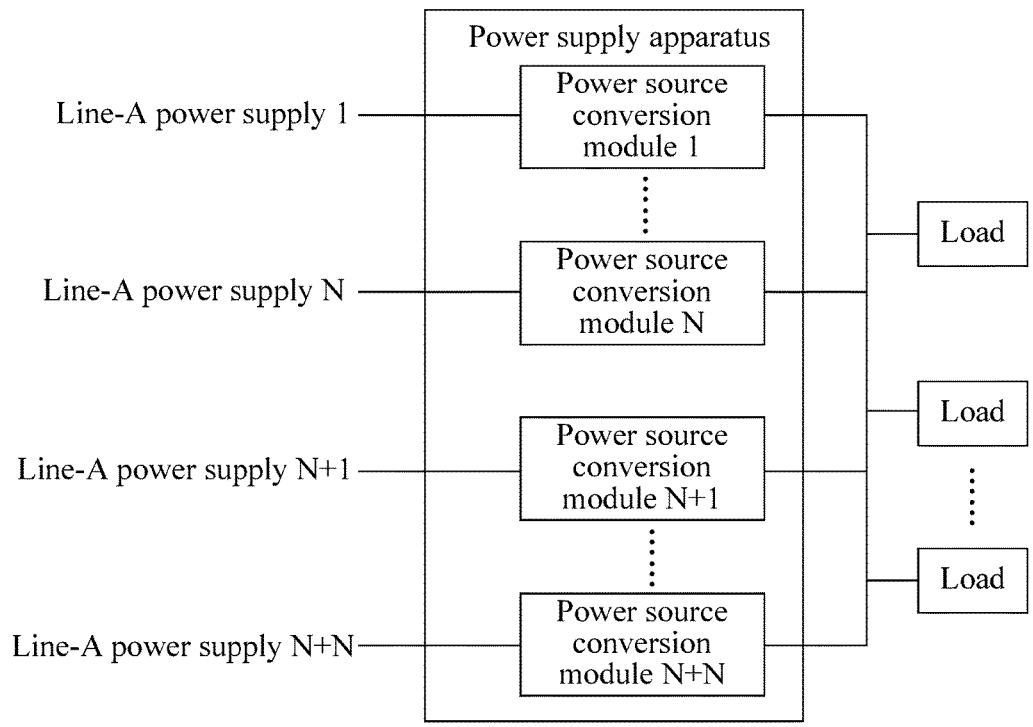
FIG. 1 is a schematic structural diagram of a power supply apparatus according to the prior art.
Figure 2:
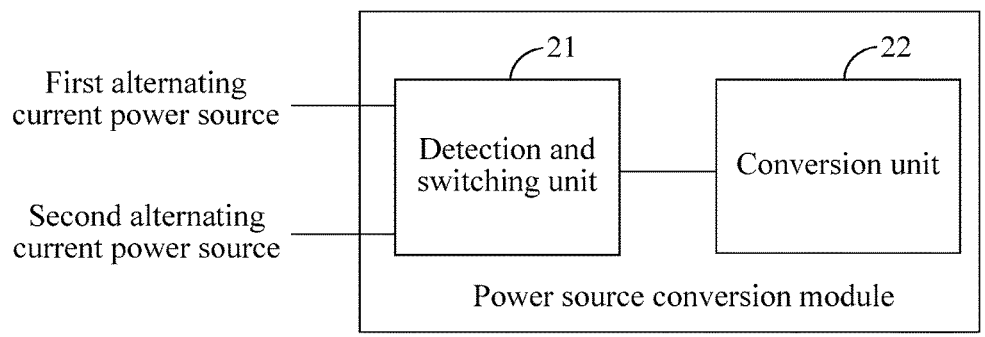
FIG. 2 is a schematic structural diagram of a power source conversion module according to an embodiment of the present invention.

FIG. 2 is a schematic structural diagram of a power source conversion module of a power supply apparatus according to an embodiment of the present invention. As shown in FIG. 2, a power source conversion module includes a detection and switching unit 21 and a conversion unit 22. The detection and switching unit is connected to the conversion unit, and an output end of the conversion unit may be connected to a load, so as to supply power to the load.

The detection and switching unit is further separately connected to an output end of a first alternating current power source and an output end of a second alternating current power source. The detection and switching unit has two input ends, where one input end is connected to the output end of the first alternating current power source, and the other input end is connected to the output end of the second alternating current power source. If one alternating current power source of two alternating current power sources connected to the power source conversion module works normally, the power source conversion module can supply power to the load. The first alternating current power source and the second alternating current power source may come from different power supply networks of an equipment room, or may come from two different Uninterruptible Power Supplies (UPSs) or batteries. An alternating current (AC) power source may be 220 V, 110 V or 120 V.

The detection and switching unit is configured to monitor in real time a working state of the first alternating current power source and a working state of the second alternating current power source, close a channel between the conversion unit and one alternating current power source, which is in a normal working state, of the first alternating current power source and the second alternating current power source, and shut off a channel between the conversion unit and the other alternating current power source of the first alternating current power source and the second alternating current power source.

If it is monitored that the two alternating current power sources are both in the normal working state, the detection and switching unit may close the channel between either of the alternating current power sources and the conversion unit, and shut off the channel between the other alternating current power source and the conversion unit, so that the alternating current power source in the closed channel serves as a power supply. In a case in which the two alternating current power sources are both in the normal working state, an alternating current power source whose channel to the conversion unit is closed by the detection and switching unit is a power supply that supplies power to the load, where this alternating current power source may be referred to as a main power supply, and the other is referred to as a standby power supply. If it is monitored that one power source of the two alternating current power sources is in a non-working state, and the other is in the normal working state, the detection and switching unit closes a channel between the power source in the normal working state and the conversion unit, and shut off a channel between the faulty power source and the conversion unit, so that the alternating current power source in the closed channel serves as a power supply. Optionally, the channel between the faulty power source and the conversion unit is shut off first, and then the channel between the power source in the normal working state and the conversion unit is closed, thereby avoiding the impact on the load caused by that the two power sources supply power to the load simultaneously after the faulty power source recovers back to normal.

The detection and switching unit supports dual AC inputs and one AC output, that is, the two power sources are both AC power source, and a power supply output by the detection and switching unit is an AC power source.

The conversion unit is configured to rectify an alternating current voltage output by the one alternating current power source, which is in the normal working state, in the channel closed by the detection and switching unit, and convert the alternating current voltage into a direct current voltage required by the load. The conversion unit is further configured to filter and rectify an alternating current voltage output by the one alternating current power source, which is in the normal working state, in the channel closed by the detection and switching unit, and convert the alternating current voltage into a direct current voltage required by the load.

In a case in which the channel between the first alternating current power source and the conversion unit is closed, a voltage output by the first alternating current power source is converted into the direct current voltage required by the load. In a case in which the channel between the second alternating current power source and the conversion unit is closed, a voltage output by the second alternating current power source is converted into the direct current voltage required by the load. The voltage required by the load and output by the conversion unit may be −48 V or may be 12V.

In a power source conversion module provided in this embodiment, a detection and switching unit is connected to two alternating current power sources; the detection and switching unit may close a channel between a conversion unit and one alternating current power source, which is in a normal working state, of the two power sources, and shut off a channel between the conversion unit and the other power source of a first alternating current power source and a second alternating current power source; the conversion unit converts a voltage output by the one alternating current power source in the channel closed by the detection and switching unit into a direct current voltage required by a load.

Further, after the channel between the conversion unit and one power source of the first alternating current power source and the second alternating current power source is closed, the detection and switching unit determines, according to a working state of the power source in the closed channel, whether to switch the power source connected to the conversion unit, which is as follows.

The detection and switching unit is further configured to, in a case in which the channel between the first alternating current power source and the conversion unit is closed, if the first alternating current power source is in an abnormal working state and the second alternating current power source is in a normal working state, shut off the channel between the first alternating current power source and the conversion unit, and close the channel between the second alternating current power source and the conversion unit.

In a case in which the channel between the first alternating current power source and the conversion unit is closed, when monitoring that the first alternating current power source is in an abnormal working state, that is, a faulty state, and also monitoring that the second alternating current power source is in the normal working state, the detection and switching unit shuts off the channel between the first alternating current power source and the conversion unit and closes the channel between the second alternating current power source and the conversion unit.

The detection and switching unit is further configured to, in a case in which the channel between the second alternating current power source and the conversion unit is closed, if the second alternating current power source is in an abnormal working state and the first alternating current power source is in a normal working state, shut off the channel between the second alternating current power source and the conversion unit, and close the channel between the first alternating current power source and the conversion unit.

In a case in which the channel between the second alternating current power source and the conversion unit is closed, when monitoring that the second alternating current power source is in an abnormal working state, that is, a faulty state, and also monitoring that the first alternating current power source is in the normal working state, the detection and switching unit shuts off the channel between the second alternating current power source and the conversion unit and closes the channel between the first alternating current power source and the conversion unit.

A power source conversion module provided in this embodiment uses one alternating current power source, which is in a normal working state, of two alternating current power sources connected to the power source conversion module as a power supply, and converts an alternating current voltage output by the power supply and outputs the converted alternating current voltage to a load. Therefore, dual standby is implemented on the alternating current power sources connected to the power source conversion module, thereby meeting a requirement of providing a highly reliable power supply for the load.

Figure 3:
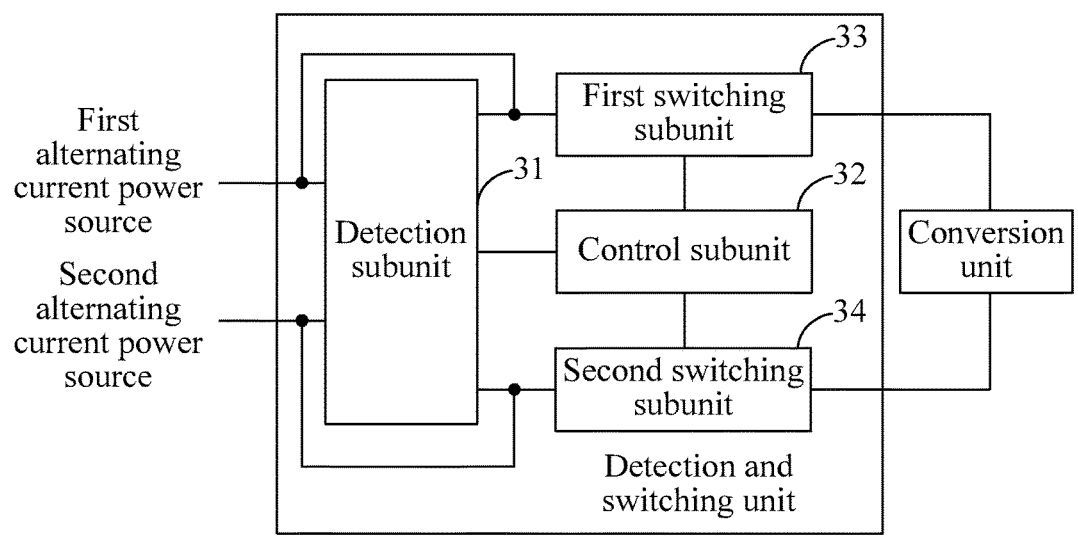
FIG. 3 is a schematic structural diagram of another power source conversion module according to an embodiment of the present invention.

FIG. 3 is a schematic structural diagram of another power source conversion module according to an embodiment of the present invention. As shown in FIG. 3, a detection and switching unit of the power source conversion module includes a detection subunit 31, a control subunit 32, a first switching subunit 33 and a second switching subunit 34.

The detection subunit is separately connected to an output end of a first alternating current power source and an output end of a second alternating current power source, and the detection subunit is further connected to the control subunit. The detection subunit includes two input ends and one output end, where one input end is connected to the output end of the first alternating current power source and the other input end is connected to the output end of the second alternating current power source, and an output unit of the detection subunit is connected to the control subunit. The detection subunit is configured to detect in real time a voltage value of the first alternating current power source and a voltage value of the second alternating current power source, and send the detected voltage value of the first alternating current power source and the detected voltage value of the second alternating current power source to the control subunit. For a circuit diagram implementing the detection subunit, refer to FIG. 4.

The control subunit is separately connected to the detection subunit, the first switching subunit and the second switching subunit. The first switching subunit is separately connected to the first alternating current power source, the conversion unit and the control subunit, and the second switching subunit is separately connected to the second alternating current power source, the conversion unit and the control subunit. The control subunit is configured to monitor in real time, according to the voltage value of the first alternating current power source, whether the first alternating current power source is in a normal working state, and monitor in real time, according to the voltage value of the second alternating current power source, whether the second alternating current power source is in a normal working state.

The control subunit may be implemented by a demand-side platform (DSP) or multiple control unit (MCU), and may perform calculation, by using an algorithm, on the voltage values transmitted by the detection subunit, to determine whether the two power sources that are input currently are alternating current power sources or direct current power sources. For an alternating current power source, it is determined whether the alternating current power source is in a normal working state by determining whether a voltage is normal and/or a frequency is normal. For a direct current power source, it is determined whether the direct current power source is in a normal working state by determining whether a voltage is normal. The abnormal voltage includes undervoltage, overvoltage and/or voltage loss. For the direct current power source, if the voltage is abnormal, it is determined that the direct current power source is in an abnormal working state. Generally, a normal frequency range of the alternating current power source is 47 hertz (HZ)-63 HZ, and when the frequency falls outside the normal frequency range, it is determined that the alternating current power source is in an abnormal working state. For the alternating current power source, if the voltage is abnormal or the frequency falls outside a normal range, it is determined that the alternating current power source is in an abnormal working state.

The control subunit is further configured to, according to a working state of the first alternating current power source and a working state of the second alternating current power source, send a closing signal to the first switching subunit or the second switching subunit connected to one alternating current power source, which is in a normal working state, of the first alternating current power source and the second alternating current power source, and send a shutoff signal to the first switching subunit or the second switching subunit connected to the other alternating current power source, so as to close the channel between the conversion unit and the one alternating current power source, which is in the normal working state, of the first alternating current power source and the second alternating current power source, and shut off the channel between the conversion unit and the other alternating current power source of the first alternating current power source and the second alternating current power source.

For example, when it is determined that the first alternating current power source and the second alternating current power source are both in a normal working state, the control subunit may send a closing signal to the first switching subunit connected to the first alternating current power source so as to close the channel between the first alternating current power source and the conversion unit, and send a shutoff signal to the second switching subunit connected to the second alternating current power source so as to shut off the channel between the second alternating current power source and the conversion unit; and the control subunit may also send a closing signal to the second switching subunit connected to the second alternating current power source so as to close the channel between the second alternating current power source and the conversion unit, and send a shutoff signal to the first switching subunit connected to the first alternating current power source so as to shut off the channel between the first alternating current power source and the conversion unit.

For another example, when it is determined that the first alternating current power source is in a normal working state and the second alternating current power source is in a non-working state, the control subunit sends a closing signal to the first switching subunit connected to the first alternating current power source so as to close the channel between the first alternating current power source and the conversion unit, and sends a shutoff signal to the second switching subunit connected to the second alternating current power source so as to shut off the channel between the second alternating current power source and the conversion unit.

For another example, when it is determined that the second alternating current power source is in a normal working state and the first alternating current power source is in an abnormal working state, the control subunit sends a closing signal to the second switching subunit connected to the second alternating current power source so as to close the channel between the second alternating current power source and the conversion unit, and sends a shutoff signal to the first switching subunit connected to the first alternating current power source so as to shut off the channel between the first alternating current power source and the conversion unit.

Further, in a case in which the channel between the conversion unit and one power source of the first alternating current power source and the second alternating current power source is closed, the control subunit determines, according to the working states of the first alternating current power source and the second alternating current power source, whether to switch the channel connected to the conversion unit, which is as follows.

The control subunit is further configured to, in a case in which the channel between the first alternating current power source and the conversion unit is closed, if the first alternating current power source is in an abnormal working state and the second alternating current power source is in the normal working state, send the shutoff signal to the first switching subunit, and send the closing signal to the second switching subunit. The control subunit is further configured to, in a case in which the channel between the second alternating current power source and the conversion unit is closed, if the second alternating current power source is in an abnormal working state and the first alternating current power source is in the normal working state, send the shutoff signal to the second switching subunit, and send the closing signal to the first switching subunit.

In a case in which the channel between the first alternating current power source and the conversion unit is closed, when determining that the first alternating current power source is in an abnormal working state, that is, a faulty state, the control subunit sends the shutoff signal to the first switching subunit. Further, it is determined whether the second alternating current power source is in the normal working state, and if the second alternating current power source is in the normal working state, the control subunit sends the closing signal to the second switching subunit. In a case in which the channel between the first alternating current power source and the conversion unit is closed, when determining that the first alternating current power source is in the normal working state, the control subunit does not need to send a control signal to the first switching subunit and the second switching subunit, and maintains original states of the two channels.

Likewise, in a case in which the channel between the second alternating current power source and the conversion unit is closed, when determining that the second alternating current power source is in the faulty state, the control subunit sends the shutoff signal to the second switching subunit. Further, it is determined whether the first alternating current power source is in the normal working state, and if the first alternating current power source is in the normal working state, the control subunit further sends the closing signal to the first switching subunit. In a case in which the channel between the second alternating current power source and the conversion unit is closed, when determining that the second alternating current power source is in the normal working state, the control subunit does not need to send a control signal to the first switching subunit and the second switching subunit, and maintains original states of the two channels.

Generally, a power source of the first alternating current power source and the second alternating current power source may be selected as a main power source, and the other power source is a standby power source. When determining that the main power source is in an abnormal working state and the standby power source is in a working state, the control subunit sends a shutoff signal to the switching subunit connected to the main power source, and sends a closing signal to the switching subunit connected to the standby power source. In a case in which the channel between the main power source and the conversion unit is closed, if it is determined that the main power source is in a normal working state, the control subunit does not need to send a control signal to the two switching subunits.

The first switching subunit is configured to shut off or close the channel between the first alternating current power source and the conversion unit according to the control signal sent by the control subunit. If the control signal sent by the control subunit to the first switching subunit is a shutoff signal, the channel between the first alternating current power source and the conversion unit is shut off, so as to isolate the first alternating current power source from the conversion unit; and if the control signal is a closing signal, the channel between the first alternating current power source and the conversion unit is closed, so as to connect the first alternating current power source and the conversion unit.

The second switching subunit is configured to shut off or close the channel between the second alternating current power source and the conversion unit according to the control signal sent by the control subunit. If the control signal sent by the control subunit to the second switching subunit is a shutoff signal, the channel between the second alternating current power source and the conversion unit is shut off, and if the control signal is a closing signal, the channel between the second alternating current power source and the conversion unit is closed.

Figure 5A:
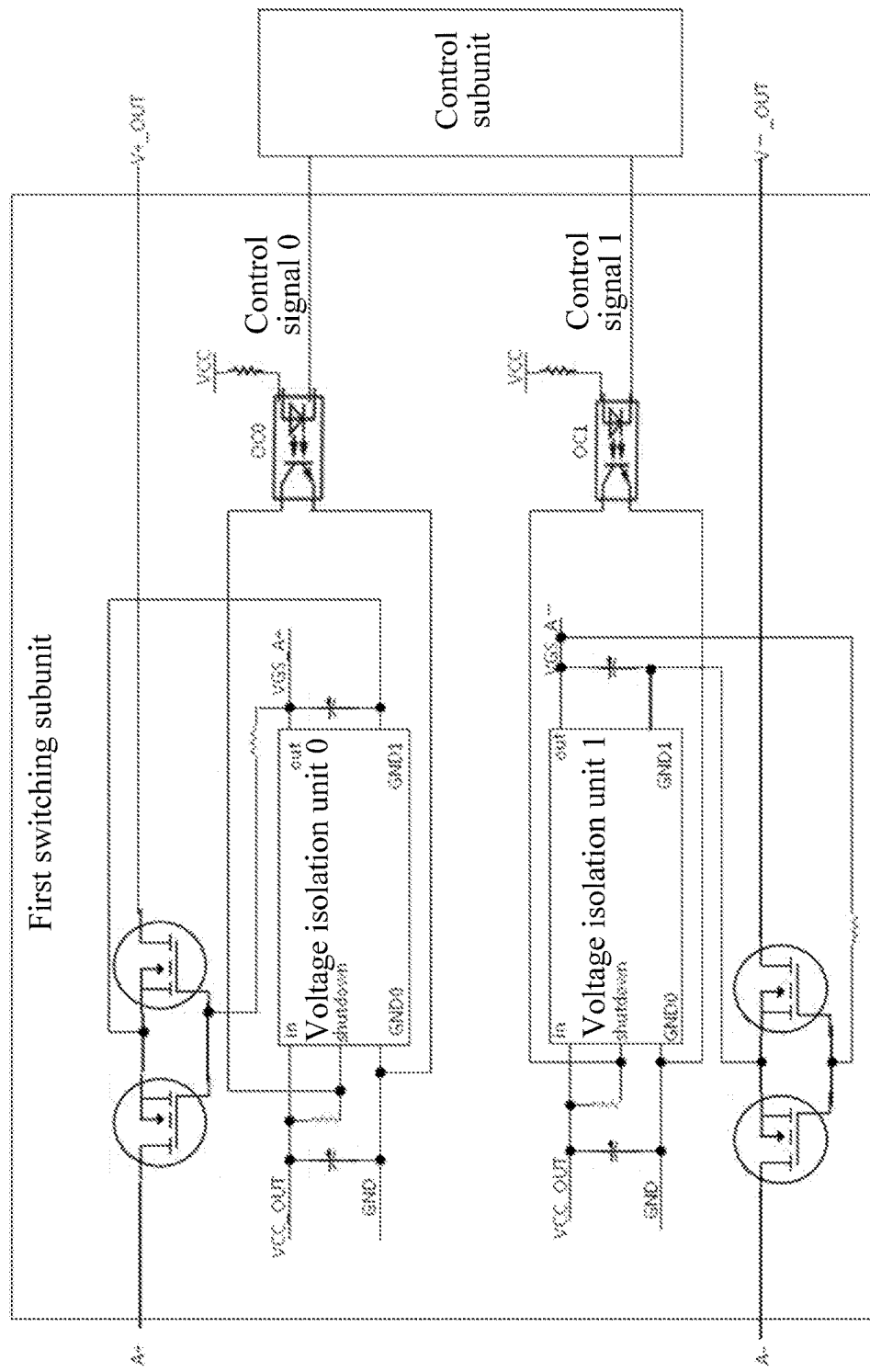
FIG. 5A is a circuit structural diagram of a first switching subunit according to an embodiment of the present invention.
Figure 5B:
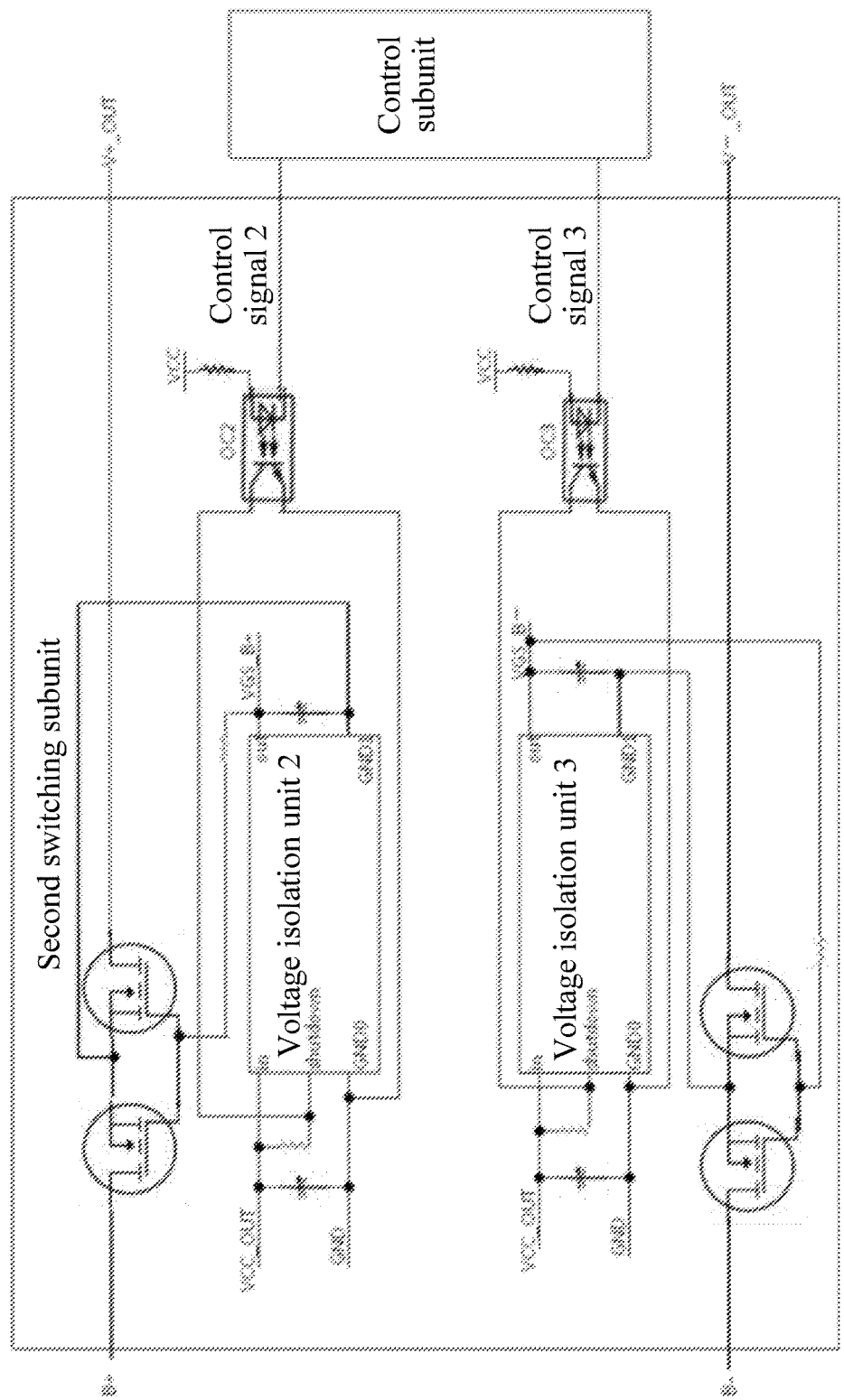
FIG. 5B is a circuit structural diagram of a second switching subunit according to an embodiment of the present invention.

A circuit structure of the first switching subunit is the same as a circuit structure of the second switching subunit, and for details, refer to circuit structural diagrams provided in FIG. 5A and FIG. 5B separately.

In this embodiment, a control subunit separately sends a control signal to a first switching subunit and a second switching subunit according to a voltage value of a first alternating current power source and a voltage value of a second alternating current power source that are transmitted by a detection subunit, so that a channel between a conversion unit and one power source, which is in a normal working state, of the two power sources is in a closed state, thereby meeting a requirement of providing a highly reliable power supply for a load connected to the conversion unit.

Figure 4:
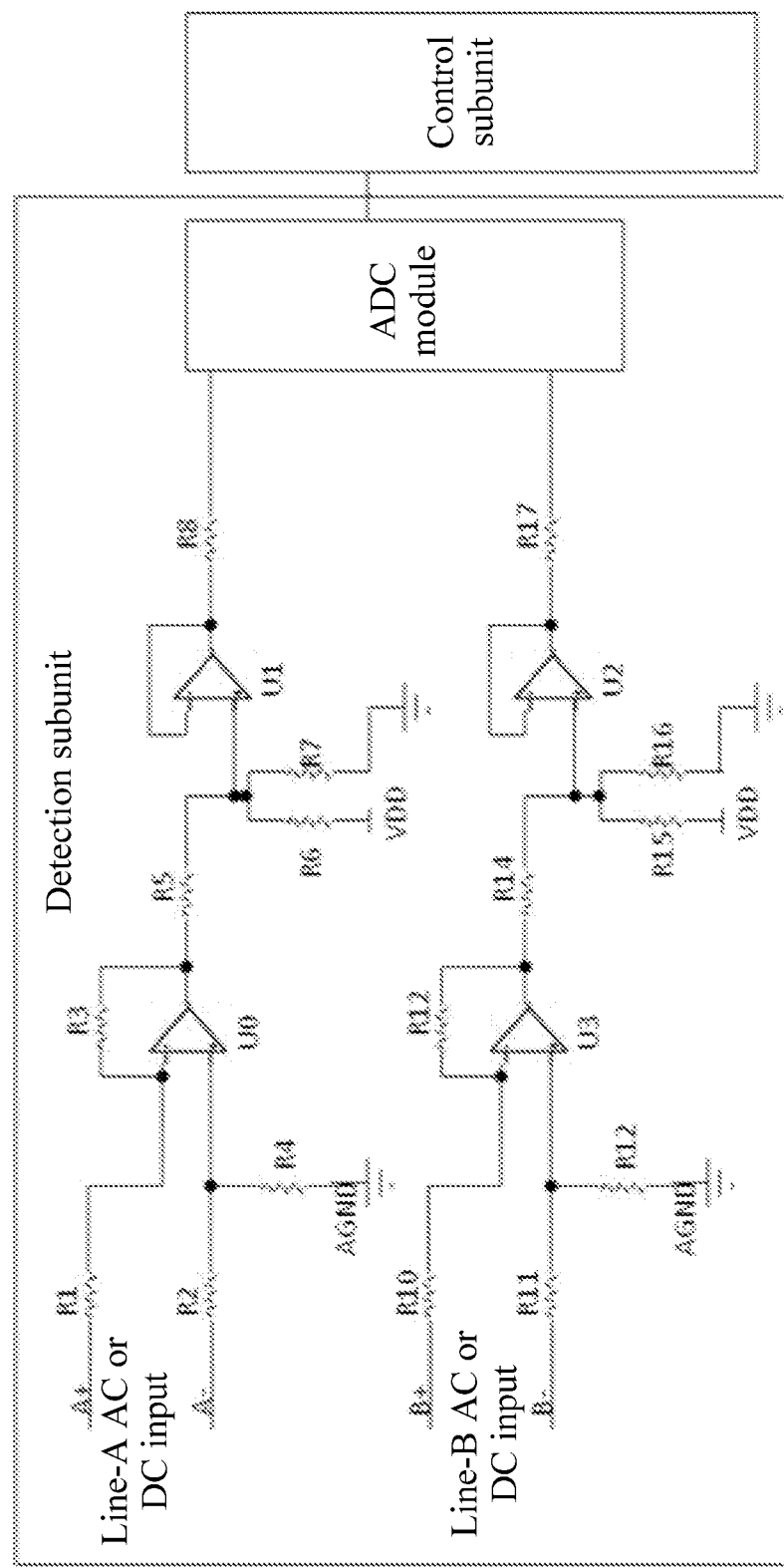
FIG. 4 is a circuit structural diagram of a detection subunit according to an embodiment of the present invention.

FIG. 4 is a circuit structural diagram of a detection subunit according to an embodiment of the present invention. The detection subunit provided in FIG. 4 may support AC fault detection, and may also support high-voltage direct current (HVDC) fault detection. As shown in FIG. 4, a line-A power source and a line-B power source are separately connected to the detection subunit; a voltage of the line-A power source and a voltage of the line-B power source are separately converted into positive voltages within a suitable range by using an operational amplifying circuit, and the positive voltages are transmitted to an analog-to-digital converter (ADC) module for detection. In a two-level operational amplifying circuit shown in FIG. 4, by using a line-A input as an example, a first-level operational amplifying circuit is U0 and resistors R1/R2/R3/R4, and a second-level operational amplifying circuit is U1 and resistors R5/R6/R7. A voltage value of the line-A input is $U_A=A_+-A_-$, the operational amplifier U0 and the resistors R1/R2/R3/R4 form a first-level amplifying circuit whose main function is to convert a high voltage that needs to be detected into a low voltage that is suitable for measurement (generally, the voltage is less than 5 V). Generally, values of resistors are as follows: R1=R2, and R3=R4; after the first-level operational amplification, an output voltage is: $U_{out1}=-U_A \times R3/R1$. The operational amplifier U1 and the resistors R5/R6/R7 form a second-level amplifying circuit whose main function is to convert a voltage (which may be a positive voltage or a negative voltage) output by the first-level operational amplifier into a positive voltage that can be detected by the ADC, and the voltage range generally is 0-3.3V. After the second-level operational amplification, an output voltage is: $U_{out2}=(U_{out1}/R5+VDD/R6)/(1/R5+1/R6+1/R7)$.

The ADC module is connected to a control subunit by using a digital interface, for example, a Serial Peripheral Interface (SPI) or an I2C interface. The control subunit can acquire in real time, by using the digital interface, a voltage value output by the ADC module. As shown in FIG. 3, the line-A power source may be a first alternating current power source or a second alternating current power source, and accordingly, the line-B power source may be the second alternating current power source or the first alternating current power source.

FIG. 5A is a circuit structural diagram of a first switching subunit according to an embodiment of the present invention. FIG. 5B is a circuit structural diagram of a second switching subunit according to an embodiment of the present invention.

A switch component inside the first switching subunit and a switch component inside the second switching subunit may be a metal oxide semiconductor field effect transistor (MOSFET), or a gallium nitride field effect transistor (GaN-FET), or a relay. In FIG. 5A and FIG. 5B, two N-channel MOSFETs or GaNFETs are used as switch components. Two back-to-back connected MOSFETs or GaNFETs are used on each channel to implement turn-off and turn-on functions of an AC or an HVDC. A main function of each of a voltage isolation unit 0, a voltage isolation unit 1, a voltage isolation unit 2 and a voltage isolation unit 3 is to generate a voltage gate to source (VGS) voltage that can drive a source end (S end) of an MOSFET or a GaNFET of a channel in which each of the voltage isolation units is located, so as to control a gate of the MOSFET or the GaNFET of the channel in which each of the voltage isolation units is located. If the switch component is a GaNFET, the VGS voltage generally is approximately 6 V; and if the switch component is a MOSFET, the VGS voltage generally is approximately 12 V. In addition, to make it convenient for the control subunit to turn off or turn on, according to switching requirements, the channel in which it is located, each of the voltage isolation unit 0, the voltage isolation unit 1, the voltage isolation unit 2 and the voltage isolation unit 3 includes a control pin used to turn off and turn on an output voltage, and by changing a level of the control pin, turn-off and turn-on control over the output voltage of the voltage isolation unit in which the control pin is located is implemented. The control pin is connected to the control subunit by using an isolation optocoupler and may turn off and turn on the output of the voltage isolation unit according to a control signal delivered by the control subunit, thereby controlling a MOSFET or a GaNFET of a corresponding channel to be turned off or turned on.

As shown in FIG. 5A and FIG. 5B, when the control subunit needs to switch a current main power source from a power source A to a power source B, the control subunit first drives both a control signal 0 and a control signal 1 to be at a high level, and in this case, corresponding isolation optocoupler OC0 and isolation optocoupler OC1 are turned off. Further, shutdown ends of the corresponding voltage isolation unit 0 and voltage isolation unit 1 are pulled to a positive voltage VCC_OUT, so that the voltage isolation unit 0 and the power source isolation unit 1 turn off the output, and a MOSFET or a GaNFET connected to A+ and A− of the first switching subunit is closed. After closing the MOSFET or the GaNFET in the first switching subunit, the control subunit drives both a control signal 2 and a control signal 3 to be at low levels, and in this case, corresponding isolation optocoupler OC2 and isolation optocoupler OC3 are turned on. Therefore, shutdown ends of the corresponding voltage isolation unit 2 and voltage isolation unit 3 are at low levels correspondingly, so that the voltage isolation unit 2 and the voltage isolation unit 3 output effective VGS_B+ and VGS_B− voltages, to drive the MOSFET or the GaNFET of the first switching subunit to be turned on, thereby switching the main power source from the power source A to the power source B.

Figure 6A:
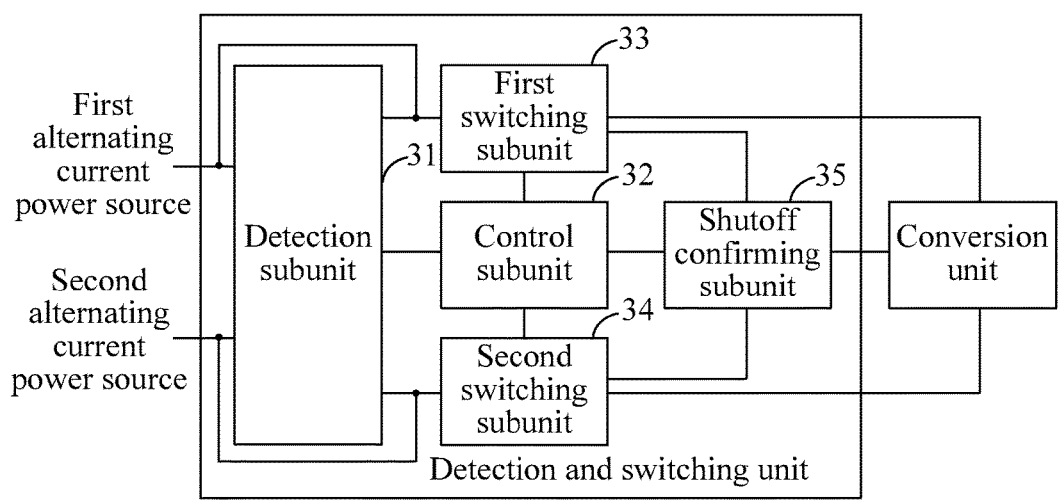
FIG. 6A is a schematic structural diagram of still another power source conversion module according to an embodiment of the present invention.

FIG. 6A is a schematic structural diagram of still another power source conversion module according to an embodiment of the present invention. As shown in FIG. 6A, to avoid the impact on a load at the moment when a power source in a faulty state recovers back to normal, a detection and switching unit may further include a shutoff confirming subunit 35, so that a control subunit sends a closing signal to the other switching subunit after determining that a switching subunit receiving a shutoff signal shuts off a corresponding channel.

The shutoff confirming subunit is separately connected to the control subunit, a first switching subunit, a second switching subunit and a conversion unit.

The control subunit is further configured to first send a shutoff signal to a first switching subunit or a second switching subunit connected to one alternating current power source, which is in an abnormal working state, of the first alternating current power source and the second alternating current power source, then send a shutoff confirming indication signal that includes a channel identifier to the shutoff confirming subunit, and after receiving a shutoff confirming signal sent by the shutoff confirming subunit, send a closing signal to the first switching subunit or the second switching subunit connected to the other alternating current power source of the first alternating current power source and the second alternating current power source, where the channel identifier is used to identify a channel between the first alternating current power source and a connection unit, or the channel between the second alternating current power source and the conversion unit.

If the first alternating current power source is in a non-working state and the second alternating current power source is in a normal working state, the control subunit sends the shutoff signal to the first switching subunit connected to the first alternating current power source, then sends the shutoff confirming indication signal that includes the channel identifier to the shutoff confirming subunit, and after receiving the shutoff confirming signal sent by the shutoff confirming subunit, sends the closing signal to the second switching subunit connected to the second alternating current power source. The control subunit informs, by using the channel identifier carried in the shutoff confirming indication signal, the shutoff confirming subunit of a power source, for which the shutoff confirming subunit needs to confirm whether a channel between the power source and the conversion unit is shut off.

The shutoff confirming subunit is configured to, after receiving the shutoff confirming indication signal sent by the control subunit, determine whether a channel corresponding to the channel identifier is shut off, and after it is determined that the channel corresponding to the channel identifier is shut off, send a shutoff confirming response signal to the control subunit.

Figure 6B:
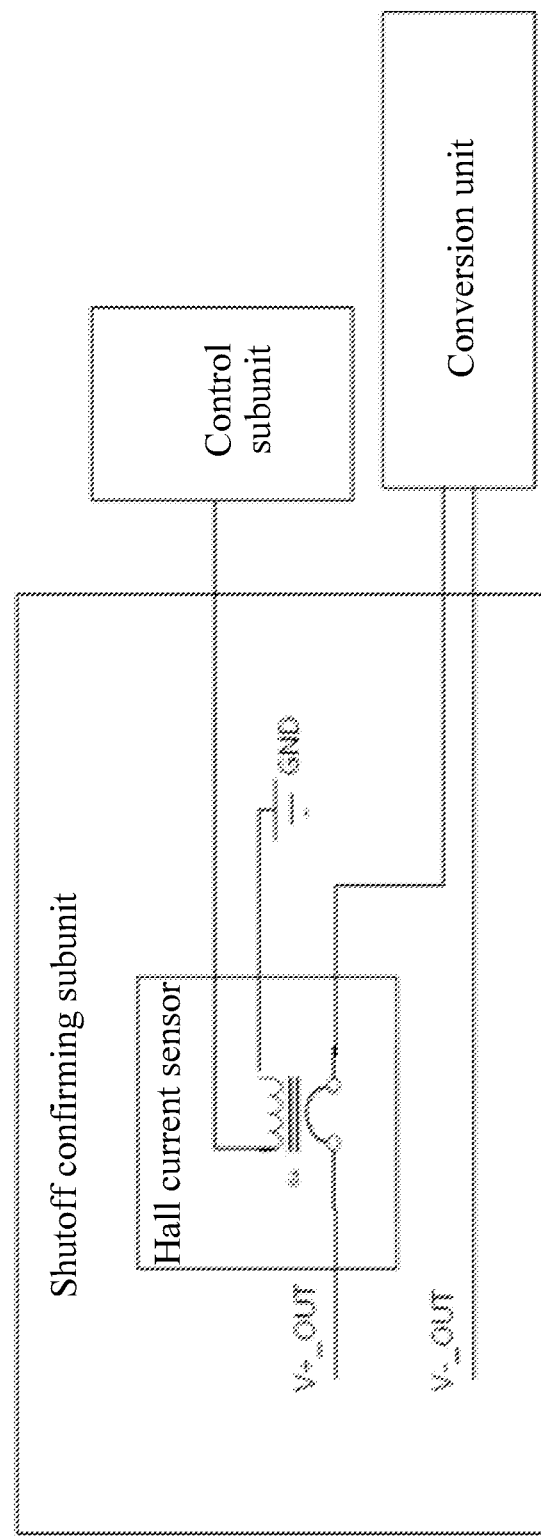
FIG. 6B is a circuit structural diagram of a shutoff confirming subunit according to an embodiment of the present invention.

A main function of the shutoff confirming subunit is that during power source switching, the control subunit first confirms whether a power source originally connected to the conversion unit is shut off, so as to avoid that a channel between another power source and the conversion unit is closed in a case in which the original power source is not shut off. A specific circuit diagram of the shutoff confirming subunit is shown in FIG. 6B. It is confirmed whether a channel in which a power source is located is shut off by detecting, by using a Hall current sensor, whether a transmission current is lower than a set threshold. To avoid incorrect determining of an alternating current sine wave at a zero crossing point, generally, software continuously confirms the current value for multiple times, and if the current value is lower than the set threshold for multiple times, it is considered that the channel in which the original power source is located is closed.

With reference to FIG. 5A and FIG. 5B, after closing a MOSFET or a GaNFET in the first switching subunit, the control subunit detects whether a response signal output by the shutoff confirming subunit is a shutoff confirming response signal, and if the response signal is the shutoff confirming response signal, it is confirmed that the channel in which the current power source A is located is closed. After it is confirmed that the channel in which the current power source A is located is closed, the control signal 2 and the control signal 3 are driven to be at low levels, and in this case, corresponding isolation optocoupler OC2 and isolation optocoupler OC3 are turned on. Further, shutdown ends of the corresponding voltage isolation unit 2 and voltage isolation unit 3 are at low levels correspondingly, so that the voltage isolation unit 2 and the voltage isolation unit 3 output effective VGS_B+ and VGS_B− voltages, to drive the MOSFET or the GaNFET of the first switching subunit to be turned on, thereby switching the main power source from the power source A to the power source B.

Figure 7:
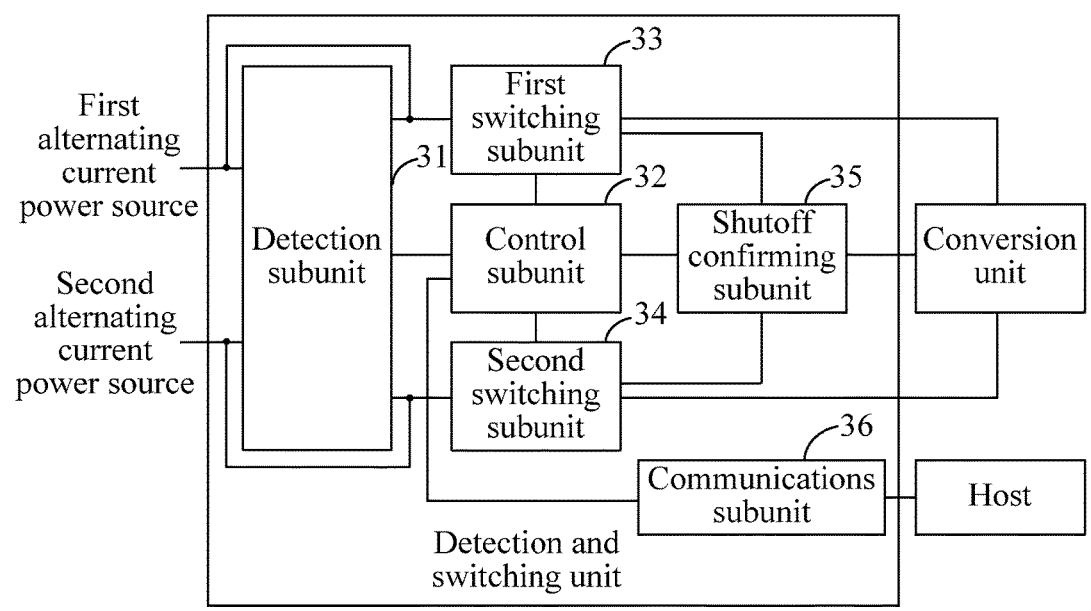
FIG. 7 is a schematic structural diagram of yet another power source conversion module according to an embodiment of the present invention.

FIG. 7 is a schematic structural diagram of yet another power source conversion module according to an embodiment of the present invention. As shown in FIG. 7, a detection and switching unit of a power source conversion module provided in this embodiment further includes a communications subunit 36.

The communications subunit is separately connected to a control subunit and a host that manages a power supply apparatus; and the control subunit is further configured to send alarm information to the communications subunit when a first alternating current power source and a second alternating current power source are both in an abnormal working state. The communications subunit is configured to transmit, to the host that manages the power supply apparatus, the alarm information sent by the control subunit.

The communications subunit may also send, to the control subunit, control and query information delivered by the host. The communications subunit may provide, according to interface requirements of different hosts, communications interfaces that match the host, for example, an inter-integrated circuit (I2C) interface, a recommended standard— 485(RS485) interface, an fast Ethernet (FE) interface, and the like.

To maintain normal working of the power source conversion module in a case of a single power source input, the detection and switching unit of the power source conversion module provided in this embodiment further includes an auxiliary power source subunit, so as to provide a required working voltage, for example, 12 V or 3.3 V, for each subunit in the detection and switching unit. The auxiliary power source subunit is separately connected to the first alternating current power source and the second alternating current power source, and the auxiliary power source subunit is further separately connected to the control subunit, a first switching subunit, a second switching subunit, a shutoff confirming subunit and the communications subunit, and configured to supply power to the control subunit, the first switching subunit, the second switching subunit, the shutoff confirming subunit and the communications subunit.

Figure 8:
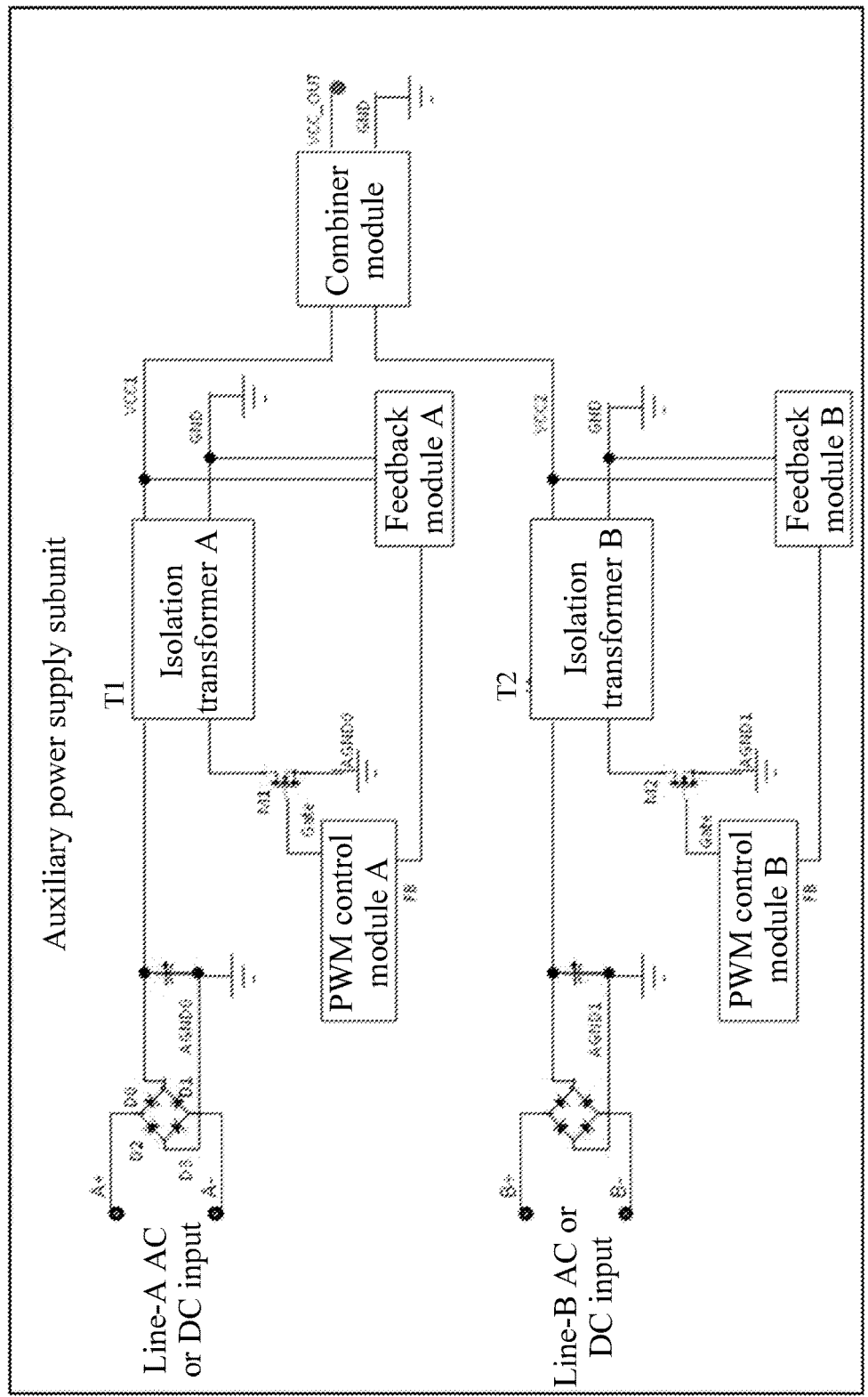
FIG. 8 is a schematic circuit diagram of an auxiliary power source subunit according to an embodiment of the present invention.

FIG. 8 is a schematic circuit diagram of an auxiliary power source subunit according to an embodiment of the present invention. As shown in FIG. 8, a line-A input and a line-B input each have one rectification module whose main function is to implement rectification processing on an input alternating current, and convert the alternating current input into a direct current output. A function of a transformer module T1 and a transformer module T2 is to implement voltage conversion according to the number of primary turns and the number of secondary turns, and implement electric isolation between a primary voltage and a secondary voltage. A function of a feedback module A and a feedback module B is to detect output voltages of respective channels, and feed back the detected voltages to Pulse Width Modulation (PWM) control modules. A PWM control module A determines, according to an output voltage VCC1 detected by the feedback module A, a duty cycle of a PWM signal output to M1, and changes an output voltage value by changing the duty cycle. Likewise, a PWM control module B determines, according to an output voltage VCC2 detected by the feedback module B, a duty cycle of a PWM signal output to M2, and changes an output voltage value by changing the duty cycle. M1 and M2 are separately a MOSFET. A function of a combiner module is to implement combination processing on VCC1 and VCC2 output voltages, and output the combined voltages to another subunit inside the detection and switching unit, thereby ensuring that the detection and switching unit can maintain normal working in a case in which any power source is faulty. Because the output power of the auxiliary power source subunit is quite low, generally the combiner module may be implemented by using 2 diodes.

The auxiliary power source subunit supports a power source input from an AC power source, and also supports a power source input from an HVDC power source. By using an input channel A as an example, when the input power source is from an AC power source, in the positive half period of an AC voltage, the internal current flow of the auxiliary power source subunit is as follows: A+>D0>T1>M1>AGND0>D3>A−. In the negative half period of the AC voltage, the internal current flow of the auxiliary power source subunit is as follows: A−>D1>T1>M1>AGND0>D2>A+. When the input power source is from an HVDC power source, the internal current flow of the auxiliary power source subunit is as follows: A+>D0>T1>M1>AGND0>D3>A−.

Figure 9:
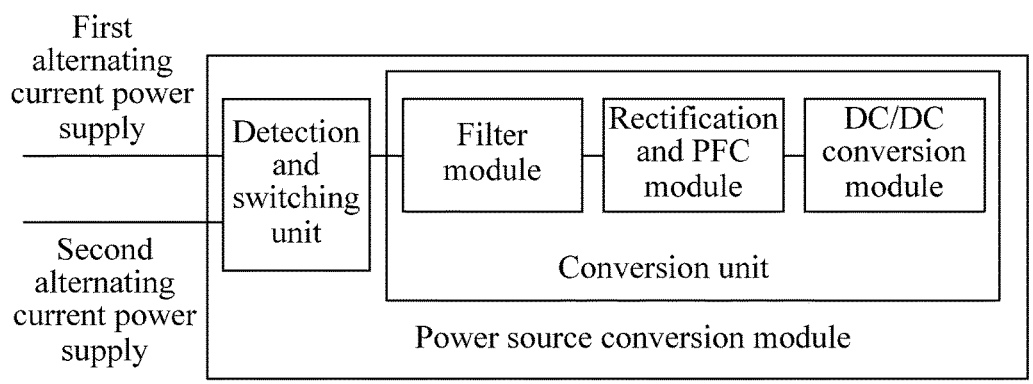
FIG. 9 is a schematic structural diagram of a conversion unit according to an embodiment of the present invention.

FIG. 9 is a schematic structural diagram of a conversion unit in a power source conversion module according to an embodiment of the present invention. As shown in FIG. 9, the conversion unit includes a filter module, a rectification and power factor correction (PFC) module and a direct current to direct current (DC/DC) conversion module.

Figure 10:
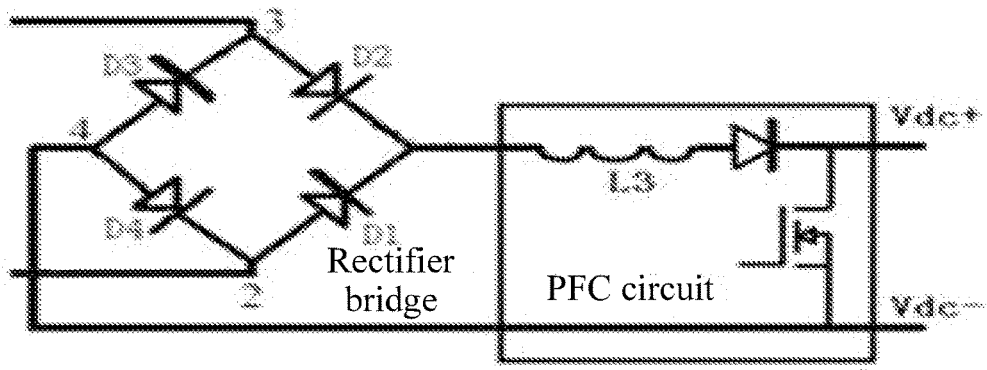
FIG. 10 is a schematic circuit diagram of a rectification and PFC module according to an embodiment of the present invention.

The filter module, the rectification and PFC module and the DC/DC conversion module are compatible with an AC input and an HVDC input, and the filter module is configured to filter a power supply of a power source conversion module. When the power supply of the power source conversion module is an AC power source, the rectification and PFC module implements harmonic suppression of the AC, and converts the AC into a direct current voltage, for example, the voltage of 380 V. When the power supply of the power source conversion module is an HVDC power source, the rectification and PFC module converts an HVDC voltage into a direct current voltage, for example, 380 V, required by a DC/DC input. The rectification and PFC module may still use the current universal circuit diagram of a rectification and PFC module; to be compatible with the AC input and the HVDC input, the rectification and PFC module needs to use components with a high voltage withstanding property. FIG. 10 is a schematic circuit diagram of a rectification and PFC module according to an embodiment of the present invention. As shown in FIG. 10, when the power supply is an HVDC power source, a current returns to a negative end after passing, from a positive input end, through a diode D2, then a PFC circuit and finally a diode D4.

The DC/DC conversion module converts the direct current voltage output by the PFC module into a direct current voltage, for example, 12 V or −48 V, required by a device load, and can implement current equalization control when multiple DC/DC conversion modules are connected in parallel.

Figure 11:
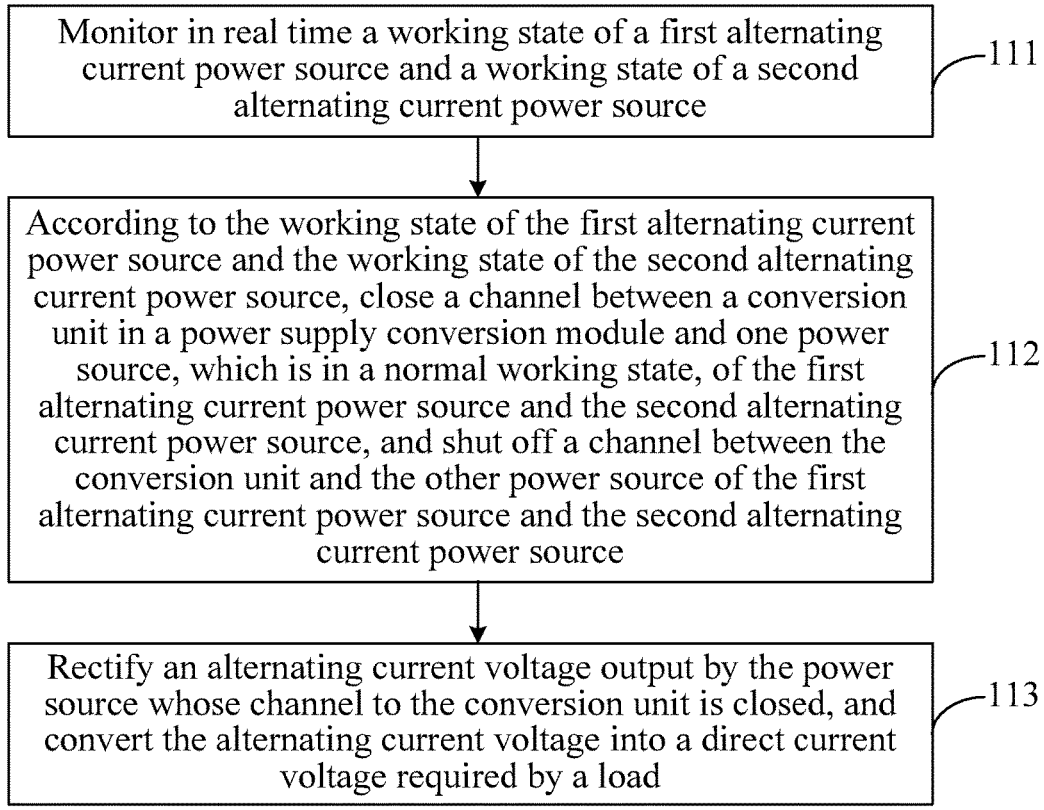
FIG. 11 is a flowchart of a power supply control method according to an embodiment of the present invention.

FIG. 11 is a flowchart of a power control method according to an embodiment of the present invention. Each power source conversion module in a power supply apparatus is separately connected to a first alternating current power source and a second alternating current power source. This embodiment is executed by a power source conversion module. As shown in FIG. 11, the power control method provided in this embodiment includes:

Step 111: Monitor in real time a working state of the first alternating current power source and a working state of the second alternating current power source.

The power source conversion module has two input ends, where one input end is connected to an output end of the first alternating current power source, and the other input end is connected to an output end of the second alternating current power source. If one power source of the two alternating current power sources connected to the power source conversion module works normally, the power source conversion module can supply power to a load. The first alternating current power source and the second alternating current power source may come from different power supply networks of an equipment room, or may come from two different UPSs or batteries. The AC power source may be 220 V, 110 V or 120 V.

The power source conversion module can monitor in real time a voltage value of the first alternating current power source and a voltage value of the second alternating current power source, determine, according to the voltage value of the first alternating current power source, whether the first alternating current power source is in a normal working state, and determine, according to the voltage value of the second alternating current power source, whether the second alternating current power source is in a normal working state.

Step 112: According to a working state of the first alternating current power source and a working state of the second alternating current power source, close a channel between a conversion unit in the power source conversion module and one power source, which is in a normal working state, of the first alternating current power source and the second alternating current power source, and shut off a channel between the conversion unit and the other power source of the first alternating current power source and the second alternating current power source.

If it is monitored that the two alternating current power sources are both in the normal working state, the power source conversion module may close the channel between either of the power sources and the conversion unit, and shut off the channel between the other alternating current power source and the conversion unit, so that the power source in the closed channel serves as a power supply. The power source conversion module supports dual AC inputs and one AC output.

When monitoring that the first alternating current power source and the second alternating current power source are both in an abnormal working state, the power source conversion module sends an alarm message to a host that manages the power supply apparatus.

In a case in which the channel between the first alternating current power source and the conversion unit is closed, if the first alternating current power source is in an abnormal working state and the second alternating current power source is in the normal working state, the channel between the first alternating current power source and the conversion unit is shut off first, and then the channel between the second alternating current power source and the conversion unit is closed. In a case in which the channel between the second alternating current power source and the conversion unit is closed, if the second alternating current power source is in an abnormal working state and the first alternating current power source is in the normal working state, the channel between the second alternating current power source and the conversion unit is shut off first, and then the channel between the first alternating current power source and the conversion unit is closed.

Step 113: Rectify an alternating current voltage output by the power source whose channel to the conversion unit is closed, and convert the alternating current voltage into a direct current voltage required by a load.

In a case in which the channel between the first alternating current power source and the conversion unit is closed, the alternating current voltage output by the first alternating current power source is rectified and converted into the direct current voltage required by the load. In a case in which the channel between the second alternating current power source and the conversion unit is closed, the alternating current voltage output by the first alternating current power source is rectified and converted into the direct current voltage required by the load. Further, the alternating current voltage output by the power source whose channel to the conversion unit is closed is rectified and converted into the direct current voltage required by the load.

In a power control method provided in this embodiment, each power source conversion module in a power supply apparatus may use one power source, which is in a normal working state, of two power sources connected to the power source conversion module as a power supply, and convert a voltage output by the power supply and output the converted voltage to a load. Therefore, dual standby is implemented for the power source connected to each power source conversion module. For a power supply apparatus including N power source conversion modules, N+N standby is implemented for the power supply input by the power supply apparatus, thereby meeting a requirement of providing a highly reliable power supply for the load. In the prior art, to implement N+N standby of the power source, a power supply apparatus requires N+N power source conversion modules, but the power supply apparatus provided in this embodiment only requires N power source conversion modules. Therefore, under the circumstance where high reliability of the power supply is met, the number of power source conversion modules included in the power supply apparatus provided in this embodiment is far less than the number of power source conversion modules included in the power supply apparatus provided in the prior art, thereby reducing production costs of the power supply apparatus. Further, to implement standby of the power source conversion module, at least one power source conversion module may be added in the power supply apparatus, and therefore, the power supply apparatus that includes N+m power source conversion modules implements not only N+N standby of the power supply but also N+m standby of the power source conversion module.

Figure 12:
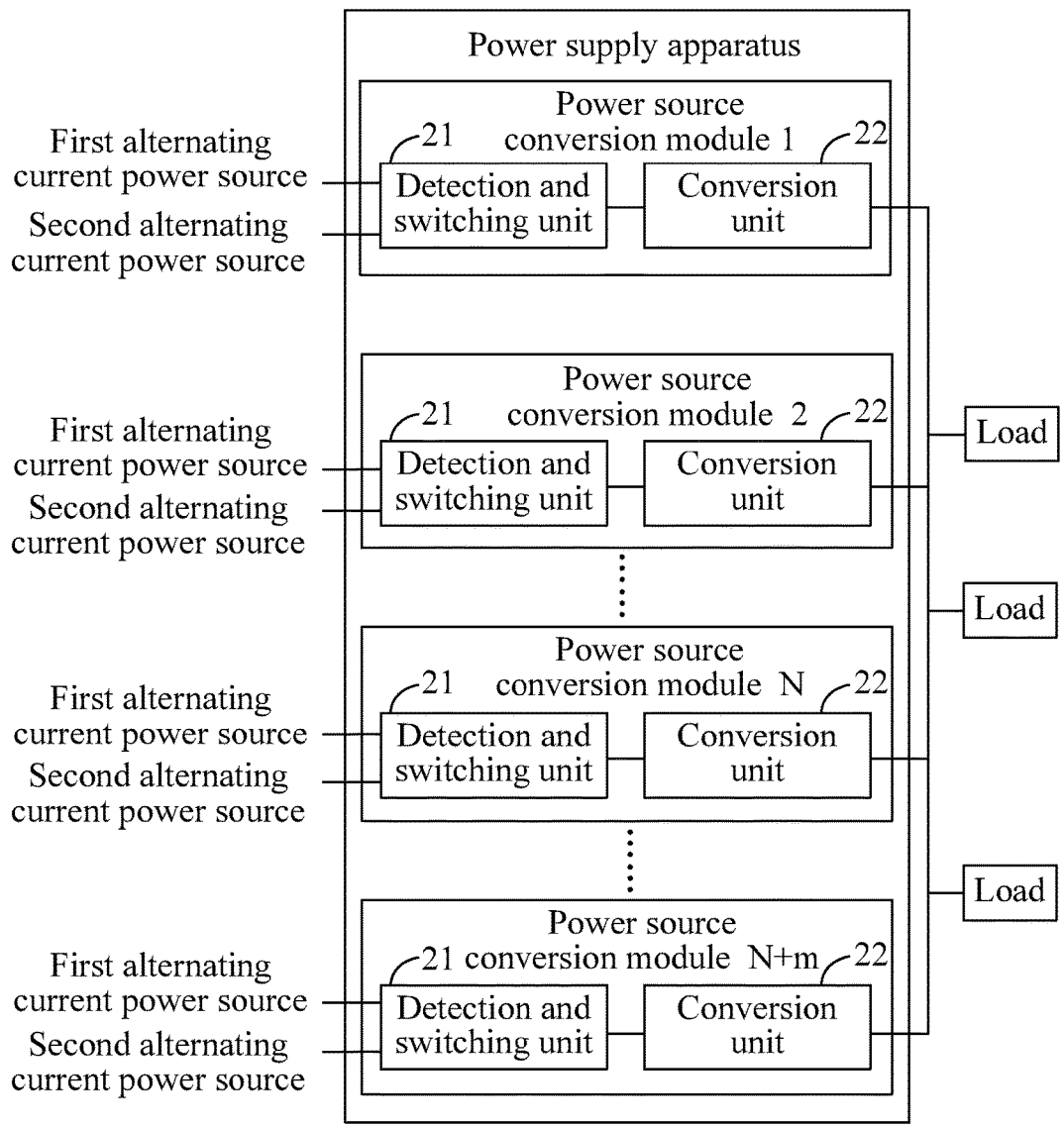
FIG. 12 is a schematic structural diagram of a power supply apparatus according to an embodiment of the present invention.

FIG. 12 is a schematic structural diagram of a power supply apparatus according to an embodiment of the present invention. As shown in FIG. 12, the power supply apparatus includes N+m power source conversion modules. Output ends of the N+m power source conversion modules are connected in parallel, and the N+m power source conversion modules support load balancing, where N is a natural number and m is an integer greater than or equal to 0 and less than or equal to N. N power source conversion modules are main power source conversion modules and m power source conversion modules are standby power source conversion modules, where m may be zero, indicating that the power supply apparatus provided in this embodiment may include no standby power source conversion module. To implement standby of the power source conversion module, 1, 2, 3 . . . , N−1, or N power source conversion modules may be added in the power supply apparatus provided in this embodiment.

The power source conversion module in FIG. 12 may be any one of the power source conversion modules in FIG. 2, FIG. 3, FIG. 6A and FIG. 7. For a specific function and a circuit structure of the power source conversion module in FIG. 12, refer to descriptions of the embodiments corresponding to FIG. 2, FIG. 3, FIG. 6A and FIG. 7, which are not described again herein.

In a power supply apparatus provided in this embodiment, each power source conversion module may use one alternating current power source, which is in a normal working state, of two alternating current power sources connected to the power source conversion module as a power supply, and convert an alternating current voltage output by the power supply and output the converted alternating current voltage to a load. Therefore, dual standby is implemented for the alternating current power source connected to each power source conversion module, and for a power supply apparatus including N power source conversion modules, N+N standby is implemented for the power supply input by the power supply apparatus, thereby meeting a requirement of providing a highly reliable power supply for the load. In the prior art, to implement N+N standby of the power source, a power supply apparatus needs N+N power source conversion modules, but the power supply apparatus provided in this embodiment only needs N power source conversion modules. Therefore, under the circumstance where high reliability of the power supply is met, the number of power source conversion modules included in the power supply apparatus provided in this embodiment is far less than the number of power source conversion modules included in the power supply apparatus provided in the prior art, thereby reducing production costs of the power supply apparatus, and reducing the power supply apparatus. Further, to implement standby of the power source conversion module, at least one power source conversion module may be added in the power supply apparatus. Therefore, the power supply apparatus that includes N+m power source conversion modules implements not only N+N standby of the power supply but also N+m standby of the power source conversion module.

A person of ordinary skill in the art may understand that all or a part of the steps in the foregoing method embodiments may be implemented by a program instructing relevant hardware. The program may be stored in a computer readable storage medium. When the program runs, the steps of the method embodiments are performed. The storage medium includes: any medium that can store program code, such as a read-only memory (ROM), a random access memory (RAM), a magnetic disk or an optical disc.

It should be finally noted that the foregoing embodiments are merely intended to describe the technical solutions of the present invention rather than to limit the present invention. Although the present invention is described in detail with reference to the foregoing embodiments, persons of ordinary skill in the art should understand that they may still make modifications to the technical solutions described in the foregoing embodiments or make equivalent replacements to a part or all technical features thereof, as long as such modifications or replacements do not cause the essence of corresponding technical solutions to depart from the scope of the technical solutions of the embodiments of the present invention.

What is claimed is:

1. A power source conversion module, comprising:
a detection and switching circuit comprising a detection subcircuit; and
a conversion circuit coupled to a load and the detection and switching circuit,
wherein the detection and switching circuit is separately coupled to an output end of a first alternating current power source and an output end of a second alternating current power source,
wherein the detection and switching circuit is configured to:
monitor, in real time, a working state of the first alternating current power source and a working state of the second alternating current power source;
close a channel between the conversion circuit and one alternating current power source that is in a normal working state, of the first alternating current power source and the second alternating current power source; and
shut off a channel between the conversion circuit and the other alternating current power source of the first alternating current power source and the second alternating current power source, and
wherein the conversion circuit is configured to:
rectify an alternating current voltage output by the one alternating current power source that is in a normal working state, in the channel closed by the detection and switching circuit; and
convert the alternating current voltage into a direct current voltage required by the load,
wherein the detection subcircuit is separately coupled to the first alternating current power source and the second alternating current power source, and
wherein the detection subcircuit comprises:
a first-level amplifying circuit configured to convert a high voltage of the first alternating current power source into a lower voltage that is suitable for measurement;
a second-level amplifying circuit coupled to the first-level amplifying circuit and configured to convert a lower voltage output by the first-level amplifying circuit into a positive voltage when the lower voltage output by the first-level amplifying circuit is a negative voltage; and
an analog to digital converter (ADC) coupled to the second-level amplifying circuit.

2. The module according to claim 1, wherein the detection and switching circuit is further configured to:
shut off the channel between the first alternating current power source and the conversion circuit when the channel between the first alternating current power source and the conversion circuit is closed and when the first alternating current power source is in an abnormal working state and the second alternating current power source is in a normal working state; and
close the channel between the second alternating current power source and the conversion circuit, and
wherein the detection and switching circuit is further configured to:
shut off the channel between the second alternating current power source and the conversion circuit when the channel between the second alternating current power source and the conversion circuit is closed and when the second alternating current power source is in an abnormal working state and the first alternating current power source is in a normal working state; and
close the channel between the first alternating current power source and the conversion circuit.

3. The module according to claim 1, wherein the detection and switching circuit comprises:
a control subcircuit;
a first switching subcircuit; and
a second switching subcircuit, wherein the detection subcircuit is further connected to the control subcircuit,
wherein the detection subcircuit is configured to:
detect in real time a voltage value of the first alternating current power source and a voltage value of the second alternating current power source; and
send the detected voltage value of the first alternating current power source and the detected voltage value of the second alternating current power source to the control subcircuit,
wherein the control subcircuit is separately coupled to the detection subcircuit, the first switching subcircuit and the second switching subcircuit,
wherein the control subcircuit is configured to:
monitor in real time, according to the voltage value of the first alternating current power source, whether the first alternating current power source is in a normal working state; and
monitor in real time, according to the voltage value of the second alternating current power source, whether the second alternating current power source is in a normal working state,
wherein the first switching subcircuit is separately coupled to the first alternating current power source, the conversion circuit and the control subcircuit,
wherein the second switching subcircuit is separately coupled to the second alternating current power source, the conversion circuit and the control subcircuit,
wherein the control subcircuit is further configured to:
send, according to a working state of the first alternating current power source and a working state of the second alternating current power source, a closing signal to the first switching subcircuit or the second switching subcircuit coupled to one alternating current power source that is in a normal working state, of the first alternating current power source and the second alternating current power source;
send a shutoff signal to the first switching subcircuit or the second switching subcircuit coupled to the other alternating current power source, so as to close the channel between the conversion circuit and the one alternating current power source that is in the normal working state, of the first alternating current power source and the second alternating current power source; and shut off the channel between the conversion circuit and the other alternating current power source of the first alternating current power source and the second alternating current power source, wherein the first switching subcircuit is configured to shut off or close the channel between the first alternating current power source and the conversion circuit according to a control signal sent by the control subcircuit, and wherein the second switching subcircuit is configured to shut off or close the channel between the second alternating current power source and the conversion circuit according to the control signal sent by the control subcircuit.

4. The module according to claim 3, wherein the control subcircuit is further configured to:

send the shutoff signal to the first switching subcircuit when the channel between the first alternating current power source and the conversion circuit is closed and when the first alternating current power source is in an abnormal working state and the second alternating current power source is in a normal working state; and send the closing signal to the second switching subcircuit, and wherein the control subcircuit is further configured to:

send the shutoff signal to the second switching subcircuit when the channel between the second alternating current power source and the conversion circuit is closed and when the second alternating current power source is in an abnormal working state and the first alternating current power source is in a normal working state; and send the closing signal to the first switching subcircuit.

5. The module according to claim 4, wherein the detection and switching circuit further comprises a shutoff confirming subcircuit, wherein the shutoff confirming subcircuit is separately coupled to the control subcircuit, the first switching subcircuit, the second switching subcircuit and the conversion circuit, wherein the control subcircuit is further configured to:

first send the shutoff signal to the first switching subcircuit or the second switching subcircuit coupled to one alternating current power source that is in an abnormal working state, of the first alternating current power source and the second alternating current power source;

then send a shutoff confirming indication signal that comprises a channel identifier to the shutoff confirming subcircuit; and send the closing signal to the first switching subcircuit or the second switching subcircuit coupled to the other alternating current power source of the first alternating current power source and the second alternating current power source after receiving a shutoff confirming signal sent by the shutoff confirming subcircuit, wherein the channel identifier is used to identify the channel between the first alternating current power source and the conversion circuit, or the channel between the second alternating current power source and the conversion circuit, and wherein the shutoff confirming subcircuit is configured to:

determine whether a channel corresponding to the channel identifier is shut off after receiving the shutoff confirming indication signal sent by the control subcircuit; and send a shutoff confirming response signal to the control subcircuit after it is determined that the channel corresponding to the channel identifier is shut off.

6. The module according to claim 5, wherein the detection and switching circuit further comprises a communications subcircuit, wherein the communications subcircuit is separately coupled to the control subcircuit and a host that manages a power supply apparatus, wherein the control subcircuit is further configured to send alarm information to the communications subcircuit when the first alternating current power source is in an abnormal working state or the second alternating current power source is in an abnormal working state, and wherein the communications subcircuit is configured to transmit, to the host that manages the power supply apparatus, the alarm information sent by the control subcircuit.

7. The module according to claim 6, wherein the detection and switching circuit further comprises an auxiliary power source subcircuit, wherein the auxiliary power source subcircuit is separately coupled to the first alternating current power source and the second alternating current power source, wherein the auxiliary power source subcircuit is further separately coupled to the control subcircuit, the first switching subcircuit, the second switching subcircuit, the shutoff confirming subcircuit and the communications subcircuit, and wherein the auxiliary power source subcircuit is configured to supply power to the control subcircuit, the first switching subcircuit, the second switching subcircuit, the shutoff confirming subcircuit and the communications subcircuit.

8. The module according to claim 3, wherein the detection and switching circuit further comprises a shutoff confirming subcircuit, wherein the shutoff confirming subcircuit is separately coupled to the control subcircuit, the first switching subcircuit, the second switching subcircuit and the conversion circuit, wherein the control subcircuit is further configured to:

first send the shutoff signal to the first switching subcircuit or the second switching subcircuit coupled to one alternating current power source that is in an abnormal working state, of the first alternating current power source and the second alternating current power source;

then send a shutoff confirming indication signal that comprises a channel identifier to the shutoff confirming subcircuit; and send the closing signal to the first switching subcircuit or the second switching subcircuit coupled to the other alternating current power source of the first alternating current power source and the second alternating current power source after receiving a shutoff confirming signal sent by the shutoff confirming subcircuit, wherein the channel identifier is used to identify the channel between the first alternating current power source and the conversion circuit, or the channel between the second alternating current power source and the conversion circuit, and wherein the shutoff confirming subcircuit is configured to:

determine whether a channel corresponding to the channel identifier is shut off after receiving the shutoff confirming indication signal sent by the control subcircuit; and send a shutoff confirming response signal to the control subcircuit after it is determined that the channel corresponding to the channel identifier is shut off.

9. The module according to claim 8, wherein the detection and switching circuit further comprises a communications subcircuit, wherein the communications subcircuit is separately coupled to the control subcircuit and a host that manages a power supply apparatus, wherein the control subcircuit is further configured to send alarm information to the communications subcircuit when the first alternating current power source is in an abnormal working state or the second alternating current power source is in an abnormal working state, and wherein the communications subcircuit is configured to transmit, to the host that manages the power supply apparatus, the alarm information sent by the control subcircuit.

10. The module according to claim 9, wherein the detection and switching circuit further comprises an auxiliary power source subcircuit, wherein the auxiliary power source subcircuit is separately coupled to the first alternating current power source and the second alternating current power source, wherein the auxiliary power source subcircuit is further separately coupled to the control subcircuit, the first switching subcircuit, the second switching subcircuit, the shutoff confirming subcircuit and the communications subcircuit, and wherein the auxiliary power source subcircuit is configured to supply power to the control subcircuit, the first switching subcircuit, the second switching subcircuit, the shutoff confirming subcircuit and the communications subcircuit.

11. The module according to claim 8, wherein the shutoff confirming subcircuit comprises a Hall current sensor.

12. The module according to claim 1, wherein the conversion circuit comprises:
a filter subcircuit configured to filter an alternating current voltage output by the one alternating current power source that is in a normal working state;
a rectification and power factor correction (PFC) subcircuit configured to rectify the filtered alternating current voltage output by the one alternating current power source that is in a normal working state, and convert the alternating current voltage into a direct current voltage; and
a direct current (DC)/DC subcircuit configured to convert the direct current voltage output by the rectification and PFC subcircuit into a DC voltage required by the load.

13. The module according to claim 12, wherein the rectification and PFC subcircuit comprises a bridge rectifier and a PFC subcircuit, wherein the bridge rectifier comprises a first output and a second output, and wherein the PFC subcircuit comprises:
an inductor coupled to the first output;
a diode coupled to the inductor and the DC/DC subcircuit; and
a transistor coupled to the second output and the diode.

14. A power supply method, wherein each power source conversion module in a power supply apparatus is separately coupled to a first alternating current power source and a second alternating current power source, and wherein the method comprises:
monitoring in real time a working state of the first alternating current power source and a working state of the second alternating current power source;
closing, according to a working state of the first alternating current power source and a working state of the second alternating current power source, a channel between a conversion circuit in the power source conversion module and one power source that is in a normal working state, of the first alternating current power source and the second alternating current power source;
shutting off a channel between the conversion circuit and the other power source of the first alternating current power source and the second alternating current power source;
rectifying an alternating current voltage output by the one alternating current power source that is in the normal working state, in the channel closed by a detection and switching circuit;
converting the alternating current voltage into a direct current voltage required by a load; and
sending an alarm message to a host that manages the power supply apparatus when the first alternating current power source and the second alternating current power source are both in an abnormal working state.

15. The method according to claim 14, wherein the method further comprises:
shutting off the channel between the second alternating current power source and the conversion circuit when the channel between the second alternating current power source and the conversion circuit is closed and when the second alternating current power source is in an abnormal working state and the first alternating current power source is in a normal working state; and
closing the channel between the first alternating current power source and the conversion circuit.

16. The method according to claim 14, wherein the method further comprises:
shutting off the channel between the first alternating current power source and the conversion circuit when the channel between the first alternating current power source and the conversion circuit is closed and when the first alternating current power source is in an abnormal working state and the second alternating current power source is in a normal working state; and
closing the channel between the second alternating current power source and the conversion circuit.

17. The method according to claim 16, wherein monitoring in real time the working state of the first alternating current power source and the working state of the second alternating current power source comprises:
monitoring in real time a voltage value of the first alternating current power source and a voltage value of the second alternating current power source;
determining, according to the voltage value of the first alternating current power source, whether the first alternating current power source is in a normal working state; and
determining, according to the voltage value of the second alternating current power source, whether the second alternating current power source is in a normal working state.

18. The method according to claim 14, wherein monitoring in real time the working state of the first alternating current power source and the working state of the second alternating current power source comprises:
monitoring in real time a voltage value of the first alternating current power source and a voltage value of the second alternating current power source;
determining, according to the voltage value of the first alternating current power source, whether the first alternating current power source is in a normal working state; and determining, according to the voltage value of the second alternating current power source, whether the second alternating current power source is in a normal working state.

19. The method according to claim 14, wherein monitoring in real time the working state of the first alternating current power source and the working state of the second alternating current power source comprises:
  converting a high voltage of the first alternating current power source into a lower voltage that is suitable for measurement; and
  converting the lower voltage into a positive voltage when the lower voltage is a negative voltage.

20. A power supply apparatus comprising:
  N+m power source conversion modules,
  wherein output ends of the N+m power source conversion modules are coupled in parallel so as to implement load balancing,
  wherein N of the N+m power source conversion modules are main power source conversion modules,
  wherein m of the N+m power source conversion modules are standby power source conversion modules,
  wherein N is a natural number,
  wherein m is an integer greater than or equal to 0 and less than or equal to N,
  wherein each of the N+m power source conversion modules comprise a detection and switching circuit and a conversion circuit,
  wherein the detection and switching circuit comprises a detection subcircuit,
  wherein the detection and switching circuit is separately coupled to an output end of a first alternating current power source and an output end of a second alternating current power source,
  wherein the detection and switching circuit is further coupled to the conversion circuit,
  wherein the conversion circuit is coupled to a load,
  wherein the detection and switching circuit is configured to:
    monitor in real time a working state of the first alternating current power source and a working state of the second alternating current power source;
    close a channel between the conversion circuit and one alternating current power source that is in a normal working state, of the first alternating current power source and the second alternating current power source; and
    shut off a channel between the conversion circuit and the other alternating current power source of the first alternating current power source and the second alternating current power source, and
  wherein the conversion circuit is configured to:
    rectify an alternating current voltage output by the one alternating current power source that is in a normal working state, in the channel closed by the detection and switching circuit; and
    convert the alternating current voltage into a direct current voltage required by the load,
  wherein the detection subcircuit is separately coupled to the first alternating current power source and the second alternating current power source, and
  wherein the detection subcircuit comprises:
    a first-level amplifying circuit configured to convert a high voltage of the first alternating current power source into a lower voltage that is suitable for measurement;
    a second-level amplifying circuit coupled to the first-level amplifying circuit and configured to convert a lower voltage output by the first-level amplifying circuit into a positive voltage when the lower voltage output by the first-level amplifying circuit is a negative voltage; and
    an analog to digital converter (ADC) coupled to the second-level amplifying circuit.

21. The power supply apparatus according to claim 20, wherein the detection and switching circuit is further configured to:
  shut off the channel between the first alternating current power source and the conversion circuit when the channel between the first alternating current power source and the conversion circuit is closed and when the first alternating current power source is in an abnormal working state and the second alternating current power source is in a normal working state; and
  close the channel between the second alternating current power source and the conversion circuit, and
  wherein the detection and switching circuit is further configured to:
    shut off the channel between the second alternating current power source and the conversion circuit when the channel between the second alternating current power source and the conversion circuit is closed and when the second alternating current power source is in an abnormal working state and the first alternating current power source is in a normal working state; and
    close the channel between the first alternating current power source and the conversion circuit.

22. The power supply apparatus according to claim 20, wherein the detection and switching circuit comprises:
  a detection subcircuit;
  a control subcircuit;
  a first switching subcircuit; and
  a second switching subcircuit,
  wherein the detection subcircuit is separately coupled to the output end of the first alternating current power source and the output end of the second alternating current power source,
  wherein the detection subcircuit is further coupled to the control subcircuit,
  wherein the detection subcircuit is configured to:
    detect in real time a voltage value of the first alternating current power source and a voltage value of the second alternating current power source; and
    send the detected voltage value of the first alternating current power source and the detected voltage value of the second alternating current power source to the control subcircuit,
  wherein the control subcircuit is separately coupled to the detection subcircuit, the first switching subcircuit and the second switching subcircuit,
  wherein the control subcircuit is configured to:
    monitor in real time, according to the voltage value of the first alternating current power source, whether the first alternating current power source is in a normal working state; and
    monitor in real time, according to the voltage value of the second alternating current power source, whether the second alternating current power source is in a normal working state,
  wherein the first switching subcircuit is separately coupled to the first alternating current power source, the conversion circuit and the control subcircuit, wherein the second switching subcircuit is separately coupled to the second alternating current power source, the conversion circuit and the control subcircuit, wherein the control subcircuit is further configured to:
send, according to a working state of the first alternating current power source and a working state of the second alternating current power source, a closing signal to the first switching subcircuit or the second switching subcircuit coupled to one alternating current power source that is in a normal working state, of the first alternating current power source and the second alternating current power source;

send a shutoff signal to the first switching subcircuit or the second switching subcircuit coupled to the other alternating current power source, so as to close the channel between the conversion circuit and the one alternating current power source that is in the normal working state, of the first alternating current power source and the second alternating current power source; and shut off the channel between the conversion circuit and the other alternating current power source of the first alternating current power source and the second alternating current power source, wherein the first switching subcircuit is configured to shut off or close the channel between the first alternating current power source and the conversion circuit according to a control signal sent by the control subcircuit, and wherein the second switching subcircuit is configured to shut off or close the channel between the second alternating current power source and the conversion circuit according to the control signal sent by the control subcircuit.

23. The power supply apparatus according to claim 22, wherein the control subcircuit is further configured to:
send the shutoff signal to the first switching subcircuit when the channel between the first alternating current power source and the conversion circuit is closed and when the first alternating current power source is in an abnormal working state and the second alternating current power source is in a normal working state; and
send the closing signal to the second switching subcircuit; and wherein the control subcircuit is further configured to:
send the shutoff signal to the second switching subcircuit when the channel between the second alternating current power source and the conversion circuit is closed and when the second alternating current power source is in an abnormal working state and the first alternating current power source is in a normal working state; and
send the closing signal to the first switching subcircuit.

24. The power supply apparatus according to claim 23, wherein the detection and switching circuit further comprises a shutoff confirming subcircuit, wherein the shutoff confirming subcircuit is separately coupled to the control subcircuit, the first switching subcircuit, the second switching subcircuit and the conversion circuit, wherein the control subcircuit is further configured to:
first send the shutoff signal to the first switching subcircuit or the second switching subcircuit coupled to one alternating current power source that is in an abnormal working state, of the first alternating current power source and the second alternating current power source;

then send a shutoff confirming indication signal that comprises a channel identifier to the shutoff confirming subcircuit; and send the closing signal to the first switching subcircuit or the second switching subcircuit coupled to the other alternating current power source of the first alternating current power source and the second alternating current power source after receiving a shutoff confirming signal sent by the shutoff confirming subcircuit, wherein the channel identifier is used to identify the channel between the first alternating current power source and the conversion circuit, or the channel between the second alternating current power source and the conversion circuit, and wherein the shutoff confirming subcircuit is configured to:
determine whether a channel corresponding to the channel identifier is shut off after receiving the shutoff confirming indication signal sent by the control subcircuit; and send a shutoff confirming response signal to the control subcircuit after it is determined that the channel corresponding to the channel identifier is shut off.

25. The power supply apparatus according to claim 24, wherein the detection and switching circuit further comprises a communications subcircuit, wherein the communications subcircuit is separately coupled to the control subcircuit and a host that manages a power supply apparatus, wherein the control subcircuit is further configured to send alarm information to the communications subcircuit when the first alternating current power source is in an abnormal working state or the second alternating current power source is in an abnormal working state, and wherein the communications subcircuit is configured to transmit, to the host that manages the power supply apparatus, the alarm information sent by the control subcircuit.

26. The power supply apparatus according to claim 25, wherein the detection and switching circuit further comprises an auxiliary power source subcircuit, wherein the auxiliary power source subcircuit is separately coupled to the first alternating current power source and the second alternating current power source, wherein the auxiliary power source subcircuit is further separately coupled to the control subcircuit, the first switching subcircuit, the second switching subcircuit, the shutoff confirming subcircuit and the communications subcircuit, and wherein the auxiliary power source subcircuit is configured to supply power to the control subcircuit, the first switching subcircuit, the second switching subcircuit, the shutoff confirming subcircuit and the communications subcircuit.

27. The power supply apparatus according to claim 22, wherein the detection and switching circuit further comprises a shutoff confirming subcircuit, wherein the shutoff confirming subcircuit is separately connected to the control subcircuit, the first switching subcircuit, the second switching subcircuit and the conversion circuit, wherein the control subcircuit is further configured to:
first send the shutoff signal to the first switching subcircuit or the second switching subcircuit connected to one alternating current power source, which is in an abnormal working state, of the first alternating current power source and the second alternating current power source;

then send a shutoff confirming indication signal that comprises a channel identifier to the shutoff confirming subcircuit; and send the closing signal to the first switching subcircuit or the second switching subcircuit connected to the other alternating current power source of the first alternating current power source and the second alternating current power source after receiving a shutoff confirming signal sent by the shutoff confirming subcircuit, wherein the channel identifier is used to identify the channel between the first alternating current power source and the conversion circuit, or the channel between the second alternating current power source and the conversion circuit, and wherein the shutoff confirming subcircuit is configured to:
determine whether a channel corresponding to the channel identifier is shut off after receiving the shutoff confirming indication signal sent by the control subcircuit, and
send a shutoff confirming response signal to the control subcircuit after it is determined that the channel corresponding to the channel identifier is shut off.

28. The power supply apparatus according to claim 27, wherein the detection and switching circuit further comprises a communications subcircuit, wherein the communications subcircuit is separately connected to the control subcircuit and a host that manages a power supply apparatus, wherein the control subcircuit is further configured to send alarm information to the communications subcircuit when the first alternating current power source is in an abnormal working state or the second alternating current power source is in an abnormal working state, and wherein the communications subcircuit is configured to transmit, to the host that manages the power supply apparatus, the alarm information sent by the control subcircuit.

29. The power supply apparatus according to claim 28, wherein the detection and switching circuit further comprises an auxiliary power source subcircuit, wherein the auxiliary power source subcircuit is separately connected to the first alternating current power source and the second alternating current power source, wherein the auxiliary power source subcircuit is further separately connected t to the control subcircuit, the first switching subcircuit, the second switching subcircuit, the shutoff confirming subcircuit and the communications subcircuit, and wherein the auxiliary power source subcircuit is configured to supply power to the control subcircuit, the first switching subcircuit, the second switching subcircuit, the shutoff confirming subcircuit and the communications subcircuit.

\* \* \* \* \*

UNITED STATES PATENT AND TRADEMARK OFFICE
CERTIFICATE OF CORRECTION

PATENT NO. : 10,014,715 B2
APPLICATION NO. : 14/738164
DATED : July 3, 2018
INVENTOR(S) : Qingyin Fang Page 1 of 1

It is certified that error appears in the above-identified patent and that said Letters Patent is hereby corrected as shown below:

On the Title Page

Item (30), Line 1: "201310331761" should be "201310331761.0"

In the Specification

Column 30, Line 14: delete "t" after "connected"

Signed and Sealed this
Twenty-eighth Day of August, 2018

Andrei Iancu
*Director of the United States Patent and Trademark Office*